United States Patent
Akashi et al.

(10) Patent No.: US 6,438,653 B1
(45) Date of Patent: Aug. 20, 2002

(54) CACHE MEMORY CONTROL CIRCUIT INCLUDING SUMMARIZED CACHE TAG MEMORY SUMMARIZING CACHE TAG INFORMATION IN PARALLEL PROCESSOR SYSTEM

(75) Inventors: Hideya Akashi, Kunitachi (JP); Toshio Okochi, Dublin (IE); Toru Shonai, Kodaira; Masamori Kashiyama, Isehara, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/330,981

(22) Filed: Jun. 14, 1999

(30) Foreign Application Priority Data

Jun. 16, 1998 (JP) .......................................... 10-185643

(51) Int. Cl.[7] .............................................. G06F 12/06
(52) U.S. Cl. ......................... 711/128; 711/154; 711/145
(58) Field of Search ................................ 711/122, 141, 711/119, 128, 154, 145, 118, 129, 144, 156

(56) References Cited

U.S. PATENT DOCUMENTS

| | | | | |
|---|---|---|---|---|
| 5,805,855 A | * | 9/1998 | Liu ............................. | 711/108 |
| 5,829,032 A | * | 10/1998 | Komuro et al. ............. | 711/141 |
| 5,893,146 A | * | 4/1999 | Pickett ........................ | 711/128 |
| 5,897,655 A | * | 4/1999 | Mallick ....................... | 711/128 |
| 6,038,644 A | * | 3/2000 | Irie et al. .................... | 711/141 |
| 6,138,217 A | * | 10/2000 | Hamagushi .................. | 711/141 |
| 6,154,816 A | * | 11/2000 | Steely et al. ................. | 711/150 |
| 6,223,248 B1 | * | 4/2001 | Bosshart ...................... | 711/105 |
| 6,260,114 B1 | * | 7/2001 | Schug ......................... | 711/129 |
| 6,263,405 B1 | * | 7/2001 | Irie et al. .................... | 711/141 |
| 6,349,363 B2 | * | 2/2002 | Cai et al. ..................... | 711/129 |

OTHER PUBLICATIONS

Nogami et al, "A 0.5W 64kB Snoopy Cache Memory with Flexible Expandibility", ISSCC 91, Feb. 15, 1991, pp. 266–327.*

Hiroshi Kadota, et al., A 32–bit CMOS Microprocessor with On–Chip Cache and TLB I.E.E.E. Journal of Solid–State Circuits, SC–22, No. 5, NY, pp. 800–807, Oct. 1987.*

* cited by examiner

Primary Examiner—Matthew Kim
Assistant Examiner—Pierre Michel Bataille
(74) Attorney, Agent, or Firm—Antonelli, Terry, Stout & Kraus, LLP

(57) ABSTRACT

A multi-processor system includes a plurality of processor node control circuits in respective processor nodes, and a cache memory which is an external cache. Each of the processor node control circuits includes a summarized cache tag memory for storing "summarized information" which is information having a reduced number of bits by summarizing information on a cache tag portion in the cache memory and indicating whether each of blocks is effectively indexed in the cache tag portion. For cache coherence control, the summarized cache tag memory is first accessed, so that the cache tag portion is accessed only when it is determined that a target block is effectively indexed, to determine whether the cache coherence control for the node is required.

8 Claims, 13 Drawing Sheets

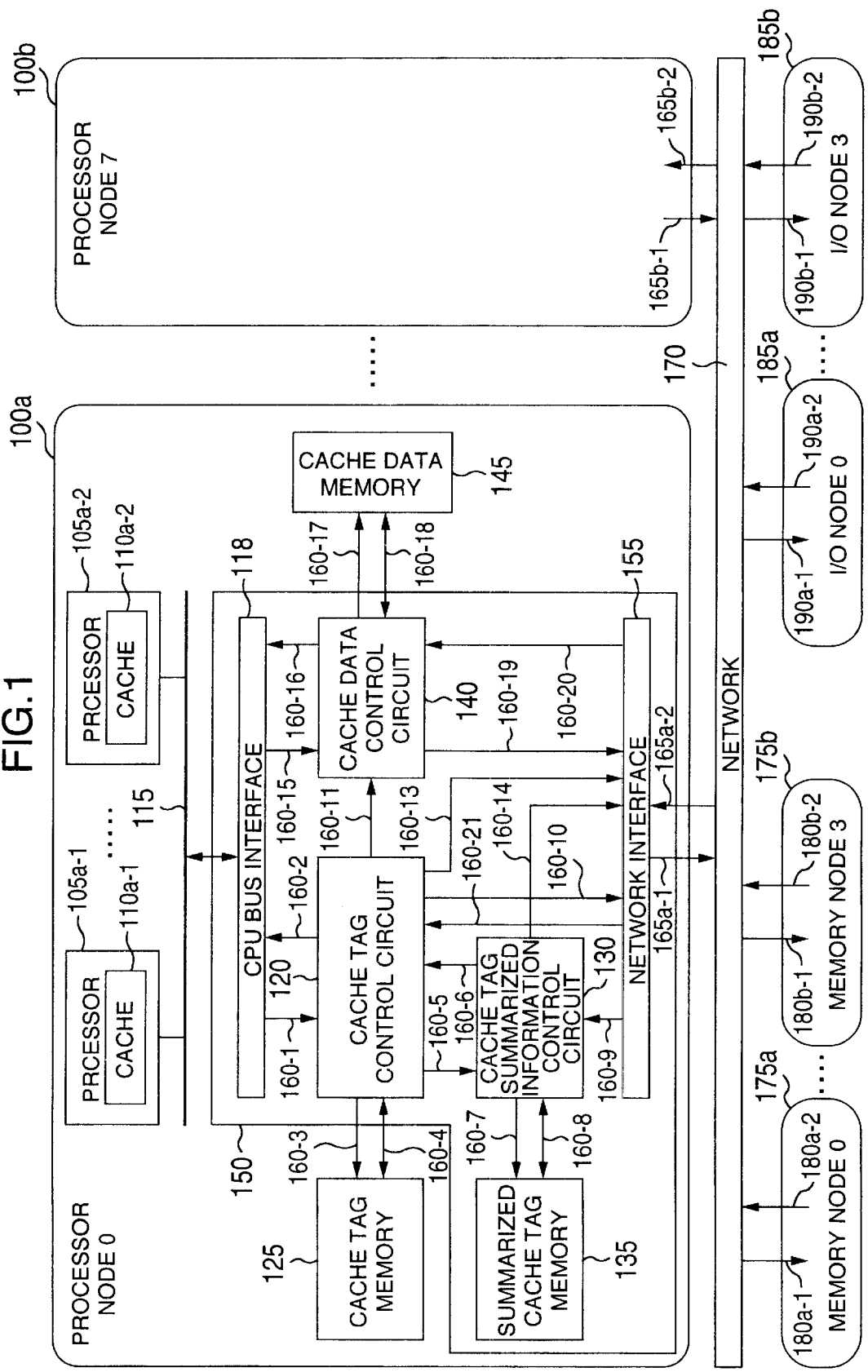

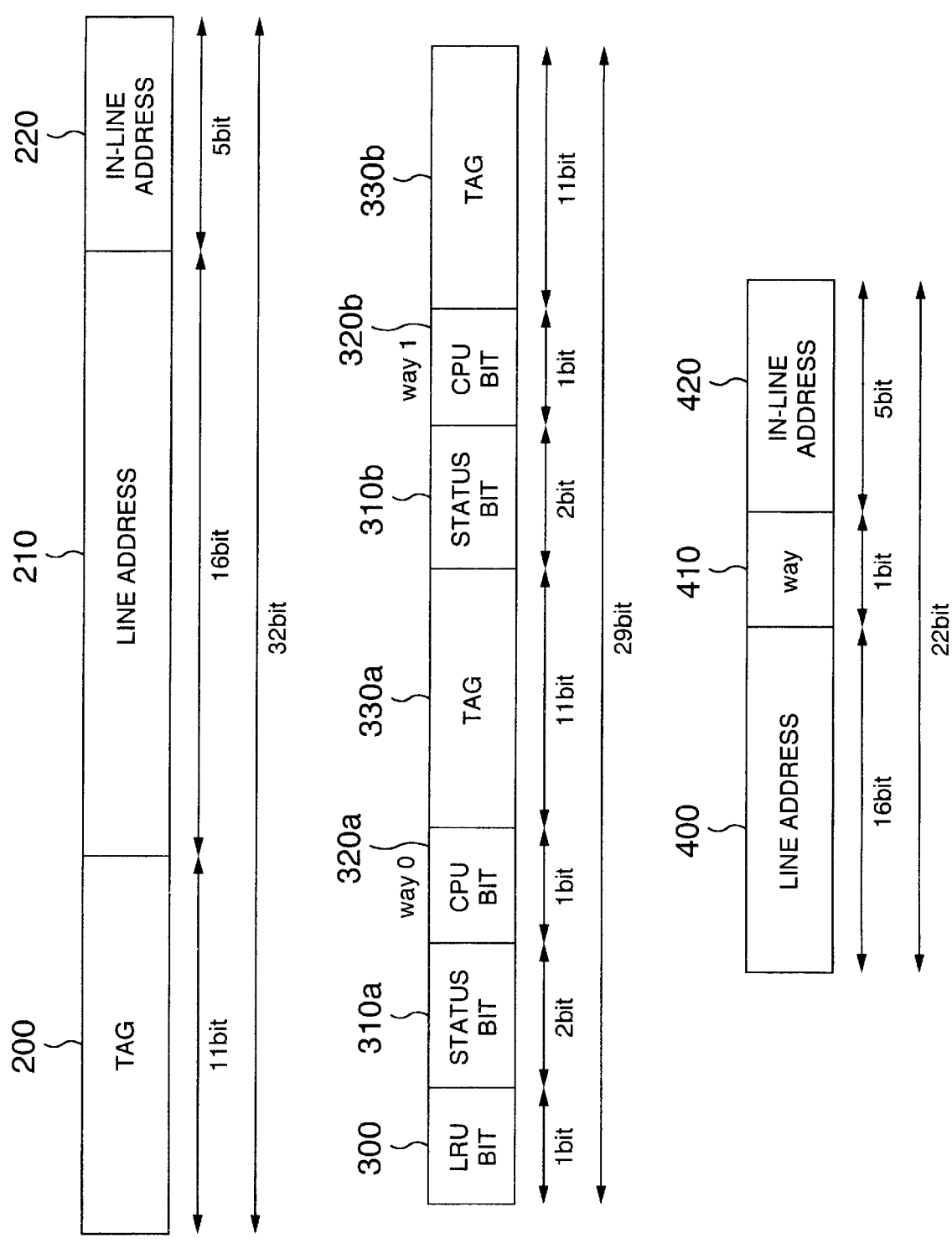

RD : MEMORY READ
RI : MEMORY READ + CACHE INVALIDATION
WB : CACHE LINE WRITE BACK

CACHE MEMORY CONTROL CIRCUIT INCLUDING SUMMARIZED CACHE TAG MEMORY SUMMARIZING CACHE TAG INFORMATION IN PARALLEL PROCESSOR SYSTEM

BACKGROUND OF THE INVENTION

1. Field of the Invention

The present invention relates to a cache memory in a computing system, and more particularly to the configuration of a cache memory added to a processor and a cache memory provided external to a processor in a computing system.

2. Description of the Related Art

The performance of microprocessors has been improved every year in consequence of improved frequencies resulting from miniaturized design processes for large-scaled integrated circuits and an enhanced processing efficiency resulting from improved schemes. With this improvement, the requirement of the improved access throughput and reduced access latency of the memory system connected to the microprocessor is increasing.

A method using cache memory has become common as a method of improving the performance of the memory system.

A cache memory is one type of memory which has a high access throughput and a short access latency although it has a small capacity as compared with a main memory. A cache memory may be disposed between a processor and a main memory to temporarily hold therein a portion of the contents of the main memory. During accesses to the memories by the processor, data held in the cache memory is supplied therefrom to enable the data to be supplied with a higher throughput and a lower latency, as compared with data supplied from the main memory. As the capacity of the cache memory is increased, target data for a memory access issued by the processor is more likely to exist on the cache memory (called "cache hit"), thus permitting an improvement in averaged access throughput and a reduction in averaged access latency.

Recent processors often have a hierarchical cache configuration which has both an internal cache that exhibits a high performance but has a small capacity and an external cache that is inferior to the internal cache in performance but has a larger capacity. The internal cache is provided in the same integrated circuit as the processor. For this reason, it can operate at a high frequency and can have a plurality of access ports, so that it can offer a higher throughput and a lower latency than the external cache. However, due to a limitation to the amount of circuits accommodated in an integrated circuit, an internal cache having a large capacity is difficult to implement. The external cache, on the other hand, is composed of dedicated or general-purpose memory devices, and is connected to an integrated circuit which serves as a processor or a cache controller. Thus, it is possible to implement a large capacity of cache as compared with the internal cache. However, in the signal lines connected to the external of the integrated circuits, the operating frequency therein becomes lower than that in the integrated circuit and the number thereof is limited, so that the throughput becomes lower as compared with the internal cache. In addition, it takes more time to transmit and receive signals to and from the integrated circuits, resulting in a longer latency. Thus, the provision of both the internal cache and the external cache can mutually complement their respective shortcomings. In recent years, a scheme having a more number of hierarchical levels has also been in practical use.

For obtaining a computing performance which cannot be realized by a single processor, a multi-processor system in which a plurality of the aforementioned processors are connected through a bus or network may be built.

In the multi-processor system, the plurality of processors access to the common memory (shared memory) to progress the processing. In such a system, when a certain processor issues a memory access, it is necessary to ensure the consistency of caches in all the processors by checking whether the most recent data exists on each of the caches in all of the remaining processors. This processing is called "cache coherence control (snoop)."

In this way, in the multi-processor system, a cache tag, which holds information on data stored in the cache memory, is accessed both for the memory access from the processor and for the cache coherence control from the remaining processors.

In JP-A-5-257809 (prior art 1), there is described a method in which an external cache is configured in accordance with a direct map scheme as a method of connecting a processor having a hierarchical cache to a system which couples a plurality of processors, and a cache tag MTAG for the external cache and a differential tag PTAG for storing differentials which are produced by excluding information included in the cache tag MTAG for the external cache from cache tag information for an internal cache are provided in the outside of the processor. In this example, MTAG and PTAG are simultaneously checked during the cache coherence control from the remaining processors to simultaneously determine the need for the cache coherence control for the external cache and the internal cache.

In the fifth embodiment of JP-A-4-230549 (prior art 2), there are described a method in which a cache tag DL2 which is substantially identical to a cache tag for an external cache of the processor (called "directory") is provided as a method of coupling each of the processors to a system bus which interconnects a plurality of processors, and DL2 is first checked during the cache coherence control from the remaining processors and then the cache tag for the external cache is accessed only when it is determined that the cache coherence control for the external cache is required. In this example, the cache tag for the external cache and the separately provided cache tag DL2 have substantially the same capacity.

In the multi-processor system, the cache tag is accessed both for the memory access from the processor and for the cache coherence control from the remaining processors. Particularly, as the multi-processor system has a larger number of processors, the amount of the cache coherence control requests from the remaining processors is increased. For this reason, a method of improving the access performance of the cache tag is required. On the other hand, since the external cache memory has a large capacity, it is difficult to implement it in the same integrated circuit as the processor or the cache controller.

While it may be possible to implement only the external cache tag in the same integrated circuit as the processor or the cache controller to improve the access performance of the cache tag, a limited capacity of the external cache tag would limit the capacity of the external cache memory. Thus, it is not suitable for a multi-processor system which runs a large scaled program.

With the cache memory configuration described in the prior art 1, the external cache tag is accessed each time the processor issues the memory access and each time the remaining processors perform the cache coherence control.

When an external cache memory having a large capacity is implemented, an external cache tag is configured as a memory external to a cache controller, thus causing difficulties in realizing a higher throughput and a lower latency. With the cache memory configuration described in the prior art 2, the external cache tag is accessed when the processor issues the memory access, while the cache tag DL2 having substantially the same contents as the external cache tag is accessed when the remaining processors perform the cache coherence control. This does increase the processing throughput of the cache tag in double. However, when the external cache memory having a large capacity is implemented, the external cache tag and the cache tag DL2 are respectively configured as memories external to the cache controller, thereby failing to reduce the latency and increasing the number of signal lines between the cache controller and the cache tags approximately in double.

SUMMARY OF THE INVENTION

It is therefore an object of the present invention to improve the throughput of a system by reducing the frequency of accesses to a cache tag memory to enable more cache tag memory accesses than the prior arts.

To achieve the above object, the present invention is a cache memory control circuit for controlling a cache memory comprising a cache tag portion and a cache data portion, wherein:
  the cache memory control circuit includes a circuit for controlling the cache memory, a summarized cache tag memory for storing information summarizing contents of cache tag information, and a cache tag summarized information control circuit for controlling the summarized cache tag memory; the cache memory has one or more sets of ways, each set including a plurality of ways for storing data on the memory in blocks; the summarized cache tag memory has a cache tag summarized information entry in correspondence to cache tag information for each of the sets stored in the cache tag portion; and the cache tag summarized information entry has a less number of bits required for storage as compared with the cache tag information for each of the sets stored in the cache tag portion.

Further, the cache memory control circuit includes an interface to a higher hierarchical level and an interface to a lower hierarchical level;
  reads the cache tag portion of the cache memory in response to an access request from the interface to the higher hierarchical level to determine whether or not a block stored in the cache memory is available; designates the cache data portion as a target for the access request from the interface to the higher hierarchical level when the result of the determination on the cache tag portion indicates that a target block stored in the cache memory is available; and issues an access request to the interface to the lower hierarchical level and receives an access result from the interface to the lower hierarchical level to store it in the cache memory and to designate the result as a target for the access request from the interface to the higher hierarchical level, when the result of the determination on the cache tag portion indicates that the target block stored in the cache memory is not available or the target block is not stored in the cache memory.

Furthermore, the cache memory control circuit includes an interface to a higher hierarchical level and an interface to a lower hierarchical level;
  reads the cache tag portion of the cache memory in response to an access request from the interface to the lower hierarchical level to determine whether or not a target block is stored in the cache memory; and performs a change of the cache tag portion of the cache memory, an invalidation of the target block, or an output of most recent data in accordance of a type of the access request from the interface to the lower hierarchical level and a status of the cache tag portion.

Furthermore, the cache memory control circuit includes an interface to a higher hierarchical level and an interface to a lower hierarchical level;
  reads a cache tag summarized information entry in the summarized cache tag memory through the cache tag summarized information control circuit in response to an access request from the interface to the higher hierarchical level to determine whether or not a target block is likely to be stored in the cache tag portion;
  reads the cache tag portion of the cache memory to determine whether or not the block stored in the cache memory is available, when it is determined as a result of the determination on the cache tag summarized information entry that the target block is likely to be stored in the cache tag portion;
  designates the cache data portion as a target for the access request from the interface to the higher hierarchical level, when it is determined as a result of the determination on the cache tag portion that the target block stored in the cache memory is available;
  issues an access request to the interface to the lower hierarchical level and receives the access result from the interface to the lower hierarchical level to store it in the cache memory and to designate this result as a target for the access request from the interface to the higher hierarchical level, when it is determined as the result of the determination on the cache tag portion that the target block stored in the cache memory is not available or that the target block is not stored in the cache memory; and
  issues an access request to the interface to the lower hierarchical level and receives the access result from the interface to the lower hierarchical level to store it in the cache memory and to designate this result as a target for the access request from the interface to the higher hierarchical level, when it is determined as the result of the determination on the cache tag summarized information entry that the target block is not likely to be stored in the cache tag portion.

Furthermore, the cache memory control circuit includes an interface to a higher hierarchical level and an interface to a lower hierarchical level;
  reads a cache tag summarized information entry in the summarized cache tag memory through the cache tag summarized information control circuit in response to an access request from the interface to the lower hierarchical level to determine whether or not a target block is likely to be stored in the cache tag portion;
  reads the cache tag portion of the cache memory to determine whether or not the target block is stored in the cache memory, when it is determined as a result of the determination on the cache tag summarized information entry that the target block is likely to be stored in the cache tag portion;
  performs a change of the cache tag portion of the cache memory, an invalidation of the target block, or an output of most recent data in accordance of a type of the access request from the interface to the lower hierarchical level and a status of the cache tag portion, when it is determined as a result of the determination that the target block is stored in the cache memory; and does not read the cache tag portion of the cache memory, when it is determined as the result of the determination on the cache tag summarized information entry that the target block is not likely to be stored in the cache tag portion.

Also, each of the cache tag summarized information entry possessed by the summarized cache tag memory has a bit length of N bits; and addresses of blocks likely to be stored in the sets of the cache tag portions corresponding to the cache tag summarized information entries are classified into N groups, wherein the cache tag summarized information entry is constituted as follows:

a first bit of the cache tag summarized information entry is registered as true when an effective address of a first group is stored in any way in the cache tag portion;

a second bit of the cache tag summarized information entry is registered as true when an effective address of a second group is stored in any way in the cache tag portion;

each of subsequent bits is registered in a similar manner; and an Nth bit of the cache tag summarized information entry is registered as true when an effective address of an Nth group is stored in any way in the cache tag portion.

Also, when the cache tag summarized information control circuit reads a cache tag summarized information entry in the summarized cache tag memory in response to an access request from the interface to the higher hierarchical level or from the interface to the lower hierarchical level to determine whether or not a target block is likely to be stored in the cache tag portion, it determines that the target block is likely to be stored in the cache tag portion when a bit in the cache tag summarized information entry which corresponds to a group number of an address of the target block for the access request is true.

Further, each of the sets in the cache tag portion is composed of N ways;

addresses of blocks likely to be stored in the sets of the cache tag portions are classified into M groups;

each cache tag summarized information entry possessed by the cache tag summarized information is composed of N fields; and each of the fields includes a portion for storing a group number and a bit indicative of validity of the group number, wherein:

the cache tag summarized information entry is constituted as follows:

when an address stored in a first way of the cache tag portion is valid, a first field in the cache tag summarized information entry sets the bit indicative of validity to "1," and stores a group number of the address in a portion for storing the group number to register it;

when the address stored in the first way of the cache tag portion is not valid, the first field in the cache tag summarized information entry sets the bit indicative of validity to "0;"

when an address stored in a second way of the cache tag portion is valid, a second field in the cache tag summarized information entry sets the bit indicative of validity to "1," and stores a group number of the address in a portion for storing the group number to register it;

when the address stored in the second way of the cache tag portion is not valid, the second field in the cache tag summarized information entry sets the bit indicative of validity to "0;"

each of subsequent fields is registered in a similar manner;

when an address stored in an Nth way of the cache tag portion is valid, an Nth field in the cache tag summarized information entry sets the bit indicative of validity to "1," and stores a group number of the address in a portion for storing the group number to register it; and when the address stored in the Nth way of the cache tag portion is not valid, the Nth field in the cache tag summarized information entry sets the bit indicative of validity to "0."

Furthermore, when the cache tag summarized information control circuit reads a cache tag summarized information entry in the summarized cache tag memory in response to an access request from the interface to the higher hierarchical level or from the interface to the lower hierarchical level to determine whether or not a target block is likely to be stored in the cache tag portion, it determines that it is likely that the target block is stored in the cache tag portion, when a group number of the address of the target block for the access request is stored in any field within the cache tag summarized information entry and a valid bit in the field is set to "1."

Furthermore, each of the sets in the cache tag portion is composed of N ways;

addresses of blocks likely to be stored in the sets of the cache tag portion are classified into M groups; and each cache tag summarized information entry possessed by the summarized cache tag memory is composed of N fields for storing group numbers, wherein:

the cache tag summarized information entry is constituted as follows:

when an address stored in a first way of the cache tag portion is valid, a first field of the cache tag summarized information entry stores a group number of the address for registration;

when an address stored in a second way of the cache tag portion is valid, a second field of the cache tag summarized information entry stores a group number of the address for registration;

each of subsequent fields are registered in a similar manner; and when an address stored in an Nth field of the cache tag portion is valid, an Nth field of the cache tag summarized information entry stores a group number of the address for registration.

Also, when the cache tag summarized information control circuit reads a cache tag summarized information entry in the summarized cache tag memory in response to an access request from the interface to the higher hierarchical level or from the interface to the lower hierarchical level to determine whether or not a target block is likely to be stored in the cache tag portion, the cache tag summarized information control circuit determines that the target block is likely to be stored in the cache tag portion, when a group number of the address of the target block directed by the access request is stored in any field within the cache tag summarized information entry.

Further, each block stored in the cache memory is managed in one of four status including an invalid status ("Invalid"), an exclusive status ("Exclusive"), a shared status ("Shared") and a modified status ("Modified") in the cache tag portion, wherein:

the invalid status indicates that the block is not stored in the cache memory;

the exclusive status indicates that the block is stored in the cache memory, the block stored in the cache data portion is identical to corresponding data on a memory, and the block is not stored in any other cache memories connected on the lower hierarchical side;

the shared status indicates that the block is stored in the cache memory, the block stored in the cache data portion is identical to the corresponding data on the memory, and the block is likely to be stored in another cache memory connected to the lower hierarchical side;

the modified status indicates that the block is stored in the cache memory, the block stored in the cache data portion is different from the corresponding data on the memory and modified data is stored, and the block is not stored in any other cache memories connected on the lower hierarchical side; and entry contents are registered in the cache tag summarized information entry of the summarized cache tag memory, only when the cache memory holds a block in the modified status or in the shared status.

The cache tag summarized information control circuit is configured to modify a corresponding cache tag summarized information entry in the summarized cache tag memory in synchronism with a change to the cache tag portion of the cache memory.

Furthermore, when no access has been issued to the cache tag portion of the cache memory, the cache tag portion is accessed together with an access to the summarized cache tag memory, and when the access has been issued to the cache tag portion of the cache memory, the access to the summarized cache tag memory is only started.

Furthermore, the interface to the higher hierarchical level is configured for connection to one or more processors or I/O devices.

The interface to the lower hierarchical level is configured for connection to one or more other cache memory control circuits or memories or I/O devices through a bus or a network.

The interface to the higher hierarchical level is configured for connection to one or more processor cores.

The interface to the lower hierarchical level is configured for connection to one or more processor buses.

Also, the present invention is a processor having a processor core section, a cache memory control circuit connected to the processor core section, and an interface section connected to the cache memory control circuit for interfacing to an external device, wherein:

the cache memory control circuit has a circuit for controlling a cache memory connected to the processor, a summarized cache tag memory for storing information summarizing contents of cache tag information, and a cache tag summarized information control circuit for controlling the summarized cache tag memory; the summarized cache tag memory has a cache tag summarized information entry in correspondence to the cache tag information stored in the cache tag portion; and the cache tag summarized information entry has a less number of bits required for storage as compared with the cache tag information stored in the cache tag portion.

Further, the present invention is a parallel processor system having a plurality of processor nodes and a memory interconnected through a network, wherein:

each of the processor nodes has one or more processors, a cache memory control circuit, a CPU bus interface for interfacing the one or more processors to the cache memory control circuit, and a network interface for interfacing the cache memory control circuit to the network; the cache memory control circuit has a circuit for controlling a connected cache memory, a summarized cache tag memory for storing information summarizing contents of cache tag information, and a cache tag summarized information control circuit for controlling the summarized cache tag memory; the summarized cache tag memory has a cache tag summarized information entry in correspondence to the cache tag information stored in the cache tag portion; and the cache tag summarized information entry has a less number of bits required for storage as compared with the cache tag information stored in the cache tag portion.

Furthermore, the present invention is a processor system having a processor node and a memory, wherein:

the processor node has one or more processors, a cache memory control circuit, a CPU bus interface for interfacing the one or more processors to the cache memory control circuit, and a network interface for interfacing the cache memory control circuit to the memory; the cache memory control circuit has a circuit for controlling a connected cache memory, a summarized cache tag memory for storing information summarizing contents of cache tag information, and a cache tag summarized information control circuit for controlling the summarized cache tag memory; the summarized cache tag memory has a cache tag summarized information entry in correspondence to the cache tag information stored in the cache tag portion; and the cache tag summarized information entry has a less number of bits required for storage as compared with the cache tag information stored in the cache tag portion.

BRIEF DESCRIPTION OF THE DRAWINGS

FIG. 1 is a diagram illustrating the configuration of a parallel computer according to a first embodiment of the present invention;

FIG. 2 is a diagram showing an address value used in the parallel computer according to the first embodiment of the present invention;

FIG. 3 is a diagram illustrating the structure of each entry stored in a cache tag memory of the parallel computer according to the first embodiment of the present invention;

FIG. 4 is a diagram showing an address value used in an access to a cache data memory in the parallel computer according to the first embodiment of the present invention;

DETAILED DESCRIPTION OF THE PREFERRED EMBODIMENTS

Figure 5:
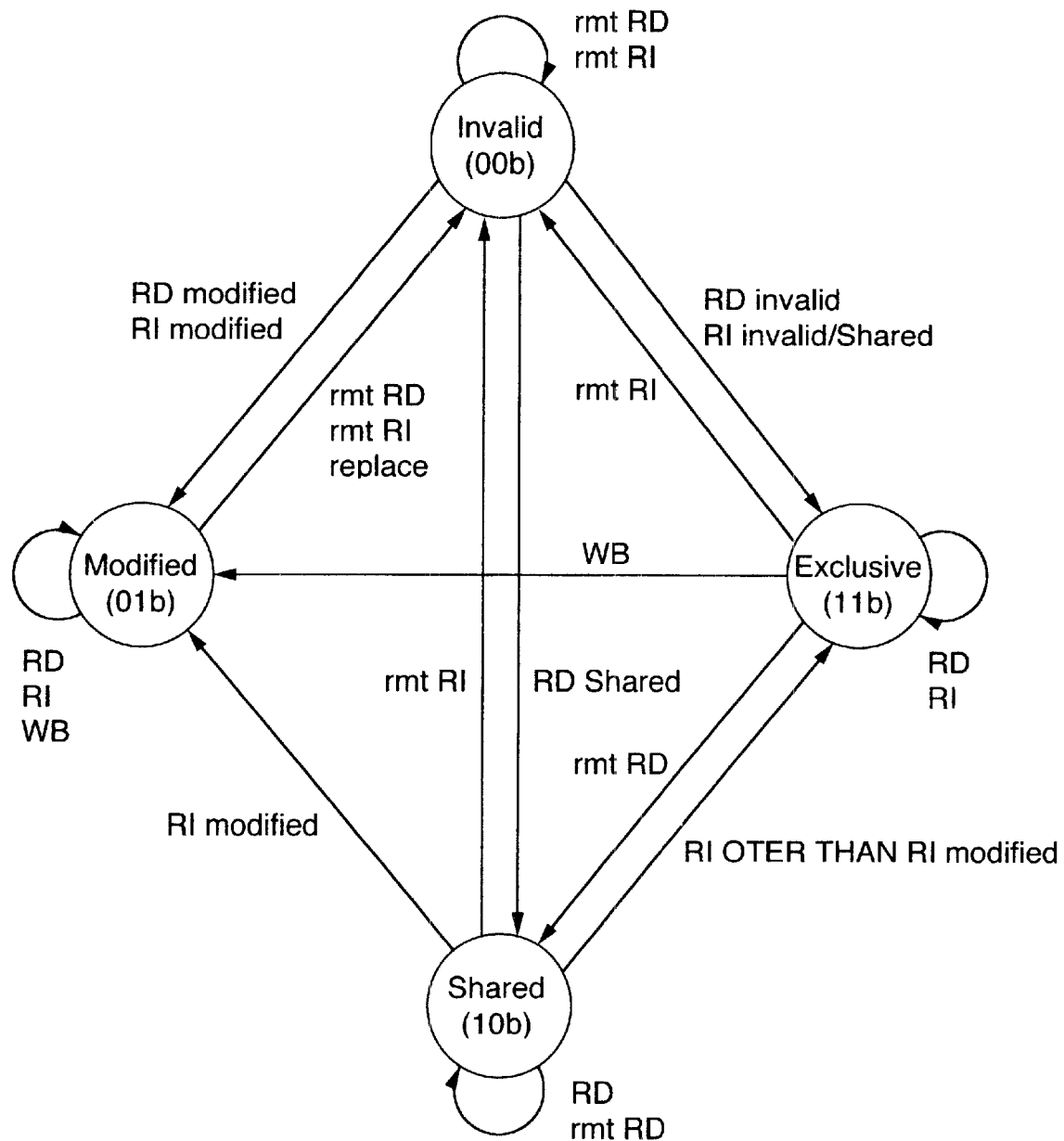
FIG. 5 is a diagram showing a state transition of a line stored in an external cache memory of the parallel computer according to the first embodiment of the present invention.

Hereinafter, several embodiments of the present invention are explained with reference to the accompanying drawings.

First Embodiment

First, a first embodiment of the present invention will be explained with reference to FIGS. 1 to 9.

FIG. 1 illustrates a parallel computer according to the present invention. The parallel computer in FIG. 1 comprises eight processor nodes 100a to 100b; four memory nodes 175a to 175b; and four I/O nodes 185a to 185b, all of which are interconnected through a network 170. The processor nodes 100a to 100b each comprise a plurality of processors 105a-1 to 105a-2 interconnected through a CPU bus 115, a processor node control circuit 150, a cache tag memory 125, and a cache data memory 145.

Each of the processors has a cache memory 110a-1 to 110a-2 internal thereto (or a temporary storage device external to the processor and connected to a processor core through signal lines other than the CPU bus 115). The processor node control circuit 150 comprises a CPU bus interface 118 for transmitting and receiving signals to and from the processors, a network interface 155 for transmitting and receiving signals to and from the network 170, a cache tag control circuit 120 for controlling the cache tag memory 125, a cache data control circuit 140 for controlling the cache data memory, a summarized cache tag memory 135 containing information summarizing the contents of the cache tag memory, and a cache tag summarized information control circuit 130 for controlling the summarized cache tag memory 135.

The memory nodes 175a to 175b constitute a main storage device for the parallel computer. A physical memory address space within the parallel computer is shared by all of the processor nodes 100a to 100b. The physical memory address space is divided into four such that the respective divided areas are allocated to the memory nodes 175a to 175b, respectively, in a distributed manner. The I/O nodes 185a to 185b constitute input/output devices of the parallel computer. A physical I/O address space within the parallel computer is shared by all of the processor nodes 100a to 100b. The physical I/O address space is divided into four such that the respective divided areas are allocated to the I/O nodes 185a to 185b, respectively, in a distributed manner.

Each of the processors 105a-1 to 105a-2 on each of the processor nodes 100a to 100b progresses the processing of a program while accessing the memory and the I/O. The I/O nodes 185a to 185b perform respective I/O processing while accessing the memory as required, in accordance with instruction from the processor which is passed thereto through the I/O access.

The processors 105a-1 to 105a-2 and the processor nodes 100a to 100b can cache the contents of the memory in the internal cache memories 110a-1 to 110a-2 and the external cache memory (a set of 125 and 145).

It is assumed in the present embodiment that the contents of the I/O device connected to the I/O node may not be cached in the processor node. For this reason, the present invention is applied only when the processor node or the I/O node accesses the memory node. Therefore, the following explanation will proceed to the exclusion of the access processing to the I/O node. It should be also noted that in the present embodiment, the I/O node does not have a cache.

Assume herein that when the I/O node accesses the contents of the memory, a coherence control should be performed for the cache memories in the processor nodes. The I/O node implements this using a memory access transaction similar to that performed by the processor node. Therefore, the following explanation will proceed to the exclusion of the access processing from the I/O node. On the contrary, if the I/O node had a cache, it might perform a similar operation to the processor node.

In the present embodiment, the internal caches and the external caches operates on the basis of the known MESI protocol. The MESI protocol enables a plurality of processor nodes (and a plurality of processors in the processor node) to cache in shared status ("Shared") the same data as those in the memory. On the other hand, the most recent data ("Modified") or the exclusive data ("Exclusive") may be cached only by any one of the processor nodes (and any processor in the processor node), whereas the remaining processor nodes (and all processors in the processor nodes) may not cache the data ("Invalid").

In order to implement this, all of the memory access requests issued onto the network 170 are each distributed to all of the remaining processor nodes except for the requesting processor node, and memory nodes to be accessed, so that the respective processor nodes perform the cache coherence control and the memory access. For example, for a memory read, all of the processor nodes receive a memory read request, and perform the cache coherence control. Specifically, if the most recent data ("Modified") exists in the cache, the data is written back. If the exclusive data ("Exclusive") exists in the cache, the data is changed to the shared data ("Shared").

Also, if the processor issues a memory read and invalidate request (details of which will be described later) when it is executing a memory write instruction, all of the processor nodes receive the memory read and invalidate request, and performs the cache coherence control. Specifically, when the most recent data ("Modified") exists in the cache, the data is written back. If the shared data ("Shared") or the exclusive data ("Exclusive") exists in the cache, the line is invalidated ("Invalid").

In the following, the memory access processing performed by the processor will be outlined for a memory read instruction, taken as an example (detailed description will be given later).

(1) The processor (for example, 105a-1), upon execution of the memory read instruction, checks whether or not a line corresponding to this instruction exists in the internal cache 110a-1. If the corresponding line exists in the internal cache, the data in the line is used as a read result (End). Conversely, if no corresponding line exists in the internal cache, the processor 105a-1 issues a memory read request to the processor node control circuit 150 through the CPU bus 115.

(2) The processor node control circuit 150, upon receipt of the memory read request, checks whether or not a corresponding line exists in the external cache memory (formed of the set of 125 and 145, and controlled by the cache tag control circuit 120 and the cache data control circuit 140). If the corresponding line exists in the external cache memory, the processor node control circuit 150 sends this line to the processor 105a-1 through the CPU bus 115. The processor 105a-1 registers this line in the internal cache 110a-1, and uses the read data in the line (End). Conversely, if no corresponding line exists in the external cache memory, a memory read request is issued through the network 170 to all of the processor nodes 100a to 100b and the memory node (for example, 175a) corresponding to the access address.

(3) The processor node which has received the memory read request, performs the coherence control for the cache memory therein. This processing may be divided into the following steps.

When the summarized cache tag memory is checked, so that it is determined that the coherence control for the internal and external caches is not necessary, the result of the cache coherence control is reported to the network 170 without issuing a cache coherence control request to the CPU bus within the processor node and without accessing the external cache tag memory 125.

When it is determined as the result of the check on the cache tag summarized information that the cache coherence control is likely to be necessary, the external cache tag memory 125 is accessed to check the external cache tag. When it is determined as this result that the coherence control is necessary for the internal cache, a cache coherence control request is issued to the CPU bus within the processor node. When it is determined that the coherence control is necessary for the external cache, the coherence control processing for the external cache is performed by the cache tag control circuit 120 and the cache data control circuit 140. Subsequently, the cache coherence control result is reported to the network 170.

In the foregoing, when the most recent line corresponding to the memory read request exists in the internal cache within the processor node or the external cache, the most recent line is transferred to the requesting processor node 100a through the network 170.

(4) The memory node 175a which has received the memory read request reads a line corresponding to an address of the memory read request from the memory to transfer it to the requesting processor node 100a through the network 170.

(5) The network 170 collects the cache coherence control results received from all of the processor nodes to transfer them to the requesting processor node 100a. In addition, it transfers the most recent line and the memory data indicated in (3) and (4).

(6) The requesting processor node 100a registers the most recent line or the memory data in the external cache (125 and 145) in accordance with the cache coherence control results, and sends it to the processor 105a-1 through the CPU bus 115. The processor 105a-1 registers this line in the internal cache 110a-1, and uses the read data in the line (End).

The present embodiment is characterized in that the summarized cache tag memory 135 and the cache tag summarized information control circuit 130 which present a smaller capacity, a higher throughput and a lower latency than the cache tag memory 125 are provided within the processor node control circuit 150, and when the transaction issued by another processor node is received through the network to perform the cache coherence control, the summarized cache tag memory 135 is first checked to partially exclude the transaction which will not require the cache coherence control, thereby reducing the frequency of the accesses to the cache tag memory 125. Thus, the cache coherence control processing can be performed in the processor node an increased number of times as compared with the prior art, when the same cache tag memory 125 is used, thereby making it possible to improve the memory access throughput of the system.

In the following, the present embodiment will be explained in detail.

The parallel computer according to the present embodiment has a 32-bit address space (4 GB). Each of the cache line sizes of the internal cache memory and external cache memory are 32 bits, and the capacity of the external cache memory is 4 MB. The capacity of the internal cache memory is 4 MB or less. A two-way set associative scheme is employed for the external cache memory. Therefore, the line addresses become to be 16-bit (32B×64K entries×2 ways=4 MB).

Outside the processor, a memory area (address space on the memory nodes 0 to 3) is accessed in units of cache lines. In the memory access issued by the processor, there are three types of transaction i.e., a memory read (RD: ReaD) transaction, a memory read and invalidate (RI: Read and Invalidate) transaction, and a memory write back (WB: Write Back) transaction.

These transactions will be explained below.

Memory Read Transaction

If the line is not stored in the internal cache 110a-1 to 110a-2 when the processor 105a-1 to 105a-2 is executing the memory read instruction (LD instruction), the processor issues the memory read (RD) transaction to the CPU bus 115. A memory read target address is added to the RD transaction. The system reads the line from any of the external cache memory, the memory, and the cache memories on the other processor nodes to return it to the issuing processor.

Memory Read and Invalidate Transaction

If the line is not stored in the internal cache 110a-1 to 110a-2 when the processor 105a-1 to 105a-2 is executing the memory write instruction (ST instruction), or if the line is stored in the S ("Shared") status, the processor issues the memory read and invalidate (RI) transaction.

The RI transaction is a transaction which invalidates the line stored in the caches in the remaining processors, and returns the read result of the line to the issuing processor. The issuing processor can perform the writing on the internal cache 110a-1 to 110a-2 for the line which is exclusively read through the RI transaction. A memory read and invalidate target address is added to the RI transaction. The system reads the line from any one of the external cache memory, the memory, or the caches on the other processor nodes to return it to the issuing processor and to invalidate the line stored in the internal caches 110a-1 to 110a-2 on the remaining processors and in the external caches (125 and 145) on the other processor nodes 100a to 100b.

Memory Write Back Transaction

When the processor 105a-1 to 105a-2 writes back a cache line, which has been previously written by the processor, to the memory (replacement of the cache line), the processor issues the memory write back (WB) transaction. A write back target address and a written back line data are added to the WB transaction. The system stores the written back line data in the external cache (the set of 125 and 145).

FIG. 2 shows an address value used in the parallel computer in FIG. 1. Since a cache line size is 32 bits, the five least significant bits (220) of the address serve as an in-line address field. A line address field 210 is a 16-bit field for specifying an entry for the external cache, and is positioned on the higher side of the in-line address field 220. An 11-bit on the higher side of this line address field 210 serves as a tag field 200.

The three most significant bits of the tag field 200 are used to specify a memory node 0 to 3 to be accessed (000b to 011b, where 011b represents "011" in binary ["3" in decimal]) or an I/O node 0 to 3 to be accessed (100b to 111b). How to use the tag field 200 will be described later.

The cache tag memory 125 is a memory which is accessed with the line address field 210 used as an address.

FIG. 3 shows each entry of the cache tag memory 125. Since the external cache memory employs the two-way set associative scheme, lines for two ways are stored at each line address. Thus, the cache tag information for two ways is stored in the cache tag memory 125.

An LRU bit 300 indicates the most recently used entry within two ways of the line address. The LRU bit 300 set at "0" indicates that way 0 has been most recently used. The LRU bit 300 set at "1" indicates that Way 1 has been most recently used.

Status bits 310a and 310b record the status of the external cache (00b: "Invalid", 01b: "Modified", 10b: "Shared", 11b; "Exclusive"). CPU bits 320a and 320b set at "1" indicate that the line is likely to be stored in the cache within the processor.

Tags 330a and 330b record the value of the tag field 200 for the line registered in the line address of the external cache memory.

When the status bits 310a and 310b are set at the value other than "00b" and either of the tags 330a and 330b matches the tag field 200 in an entry in the cache tag memory corresponding to the line address field 210 of an address "A," a line corresponding to the address "A" is stored in the way.

FIG. 4 shows a memory address for the cache data memory 145. The cache data memory 145 stores data on the external cache. Each line is specified by a 16-bit line address (400) and a 1-bit way number (410), and each data in the line is specified using an in-line address 420. The summarized cache tag memory 135 is a memory for holding information summarizing the contents of each entry in the cache tag memory 125, and is accessed with the line address field 210 used as its address.

Figure 8:
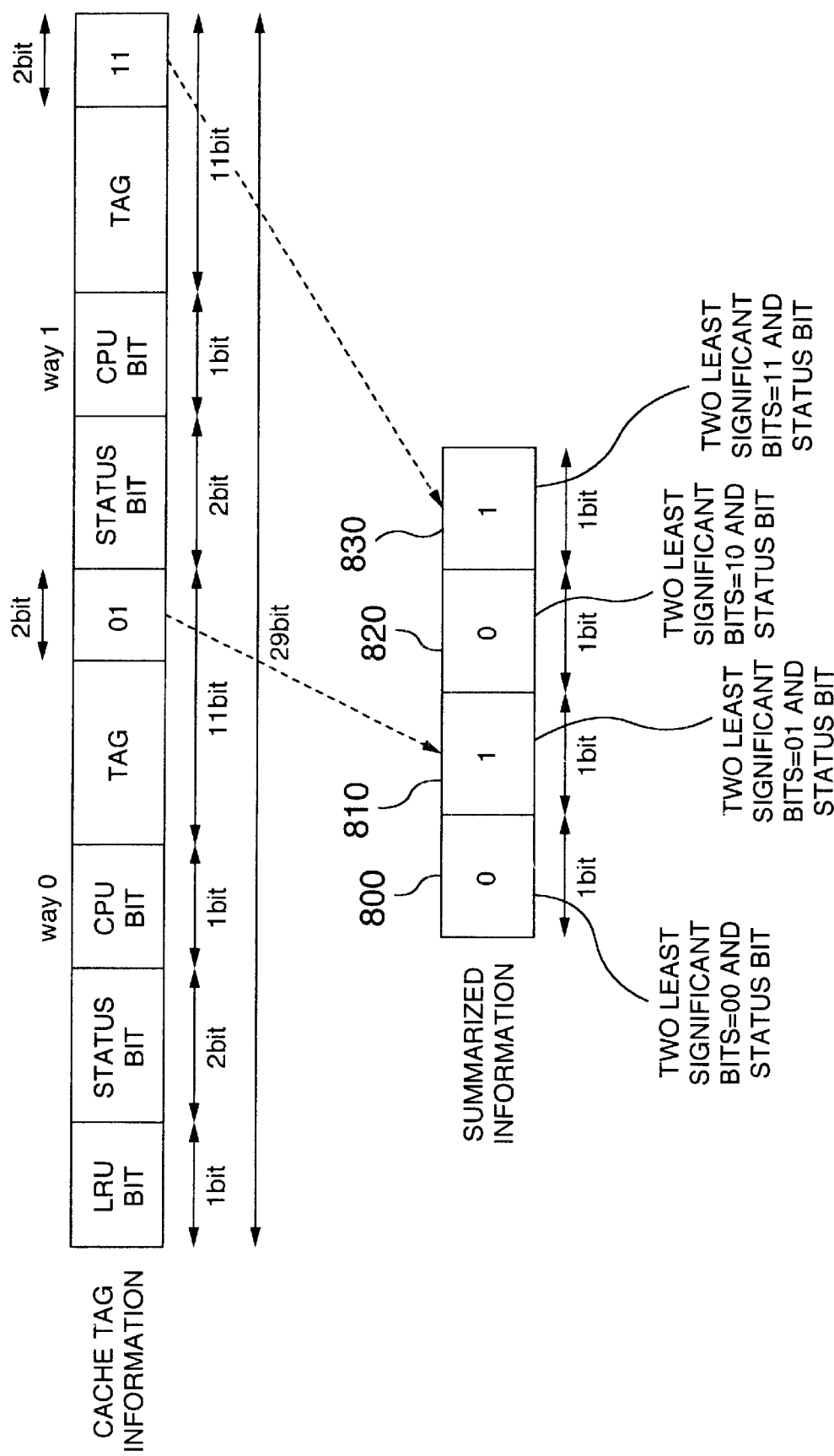
FIG. 8 is a diagram showing the structure of cache tag summarized information stored in a summarized cache tag memory in the parallel computer according to the first embodiment of the present invention.

FIG. 8 shows the structure of a cache tag summarized information used in the parallel computer of the present embodiment. The entry of the cache tag summarized information is 4-bit, and stores in a bit map configuration the two least significant bits of the tag fields 330a and 330b registered in each entry of the cache tag. A bit 800 indicates that a line having a status bit other than "00b" ("Invalid") and the two least significant bits of the tag equal to "00b" is stored in a corresponding entry of the cache tag. A bit 810 indicates that a line having a status bit other than "00b" and the two least significant bits of the tag equal to "01b" is stored in the corresponding entry of the cache tag. A bit 820 indicates that a line having a status bit other than "00b" and the two least significant bits of the tag equal to "10b" is stored in the corresponding entry of the cache tag. A bit 830 indicates that a line having a status bit other than "00b" and the two least significant bits of the tag equal to "11b" is stored in the corresponding entry of the cache tag.

It is contemplated that the bit map configuration for the cache tag summarized information may be implemented by a method which uses arbitrary bits of the tag fields 330a and 330b, or a method which records "1" only when the status bits 310a and 310b are set at a particular values (for example "1": Modified, and "3": "Exclusive").

Here, an implementation will be described for a method which records "1" when the status bits 310a and 310b are other than "00b" (other than "Invalid") for the entries other than "Invalid". However, it should be noted that the processing for other bit map configurations may be readily derived from this method.

The processor node (for example, 100a), upon receipt of a cache coherence control request transaction (for the address "A"), first checks the summarized cache tag memory 135. Specifically, it reads the cache tag summarized information entry corresponding to the line address field 210 of the address "A," and examines the bit value (for example, "810") corresponding to the two least significant bits of the tag field 200 of the address "A." When the bit 810 is set at "0," it knows that the corresponding entry in the cache tag memory 125 does not store the address "A." This is because if the address "A" was stored, the bit in the cache tag summarized information entry corresponding to the two least significant bits of the tag field 200 of the address "A" would be "1." Thus, the processor node 100a can perform a cache coherence control response without accessing the cache tag memory 125, since the address "A" is not cached in the processor node 100a.

When the bit 810 is set at "1," it knows that the address "A" is likely to be stored in the corresponding entry of the cache tag memory 125. Thus, it reads the cache tag memory 125, and checks whether or not the tag field 200 of the address "A" matches the tag 330a or 330b of the cache tag entry. If the tag field 200 of the address "A" matches the tag 330a or 330b of any way of the cache tag entry, it knows that the address "A" has been stored in the external cache memory. Thus, it must perform the cache coherence control processing. If they do not match, it knows that the address "A" has not been stored in the external cache memory.

Since the cache tag entry has a two-way structure, a maximum of two addresses may be stored therein. Thus, within four bits of the cache tag summarized information entry, a maximum of two bits may be set at "1." For this reason, on the average, 50 percent of the cache coherence controls from the other processor nodes need not access the cache tag memory 125 because the corresponding bits in the cache tag summarized information entries are at "0." It will be appreciated from this fact that the frequency of the accesses to the cache tag memory 125 can be reduced.

As described above, when a bit map having a size larger than $2^N$ is provided for a N-way based cache, the frequency of the accesses to the cache tag memory 125 can be reduced. It should be noted that while the present invention may also be implemented even with a bit map having a size equal to or smaller than $2^N$, this will result in a smaller effect in reducing the frequency of the accesses to the cache tag memory 125.

The cache tag control circuit 120 and the cache tag summarized information 130 modify the cache tag summarized information entry simultaneously with the change in the cache tag summarized information entry. The cache tag control circuit 120 and the cache tag summarized information control circuit 130 will be described later in detail.

Figure 6:
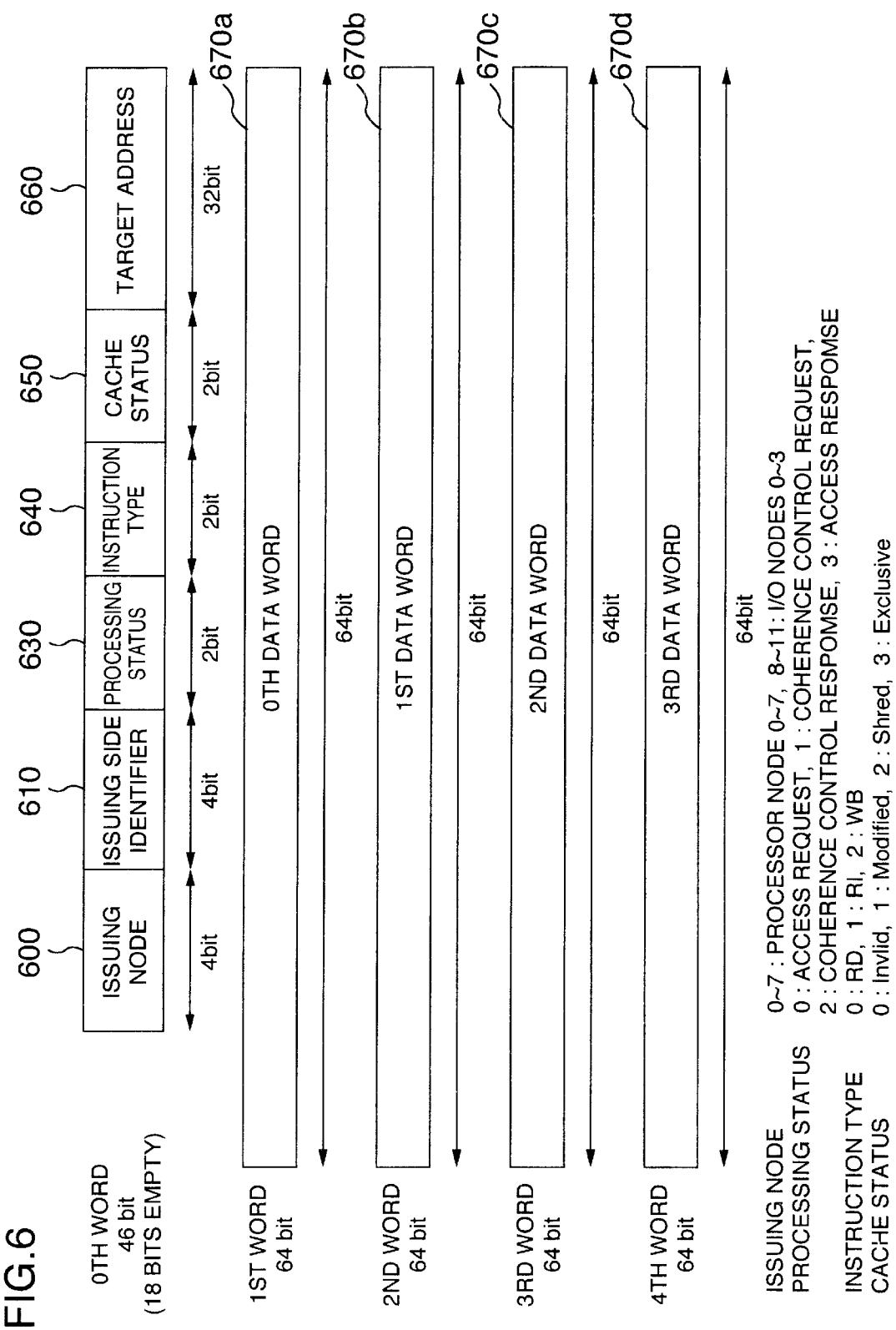
FIG. 6 is a diagram showing the structure of a transaction transferred through a network in the parallel computer according to the first embodiment of the present invention.

FIG. 6 shows the structure of the transaction communicated among the network interface 155 on the processor node, the memory nodes 175a to 175b, the I/O nodes 185a to 185b, and the network 170. The transaction includes the 0th word through the 4th word.

The 0th word has 46 bits (of which 18 bits are empty), and are organized as follows. An issuing node 600 is a field indicative of the node number of the node which has issued the request transaction. The issuing node numbers 0 to 7 indicate processor nodes 0 to 7, and the issuing node numbers 8 to 11 indicate I/O nodes 0 to 3. Since the memory nodes 175a to 175b do no issue any request transaction, they are not assigned any issuing node number. An issuing side identifier 610 is a field indicative of an identifier of the transaction within the node which has issued the request transaction. A processing status 630 is a field indicative of the status of the transaction (either of access request, coherence control request, coherence control response, and access response). How to use the respective status will be described later. An instruction type 640 is a field indicative of the type of the request transaction (RD, RI, and WB). A cache status 650 is a field indicative of a cache coherence control result ("Invalid," "Modified," and "Shared") performed by each processor node. A target address 660 is a field indicative of an address for the access.

The 1st to 4th words are data, while the 0th to 3rd data words are fields used when the line for the access is transferred.

In the following, a memory access operation in the parallel computer of the present embodiment will be described in detail.

Memory Read by Processor (1) Issuance of Memory Read (RD) Transaction from Processor:

A processor (for example, 105a-1), upon execution of the memory read instruction to the address "A," checks whether a corresponding line exists in the internal cache 110a-1. When the corresponding line exists in the internal cache, it uses the data in this line as a read result (End).

If the corresponding line does not exist in the internal cache, the processor 105a-1 issues the RD transaction to the address "A" to the CPU bus 115.

(2) Cache Coherence Control on CPU Bus:

The processor 105a-2 connected to the same CPU bus 115 as the processor 105a-1 receives the RD transaction to the address "A" to perform the cache coherence control for the internal cache 110a-2.

(2-1) When the processor 105a-2 does not hold the line corresponding to the address "A," it returns the cache status "Invalid" to the CPU bus 115.

(2-2) When the processor 105a-2 holds the line corresponding to the address "A" in the "Shared" status or in the "Exclusive" status, the processor 105a-2 returns the cache status "Shared" to the CPU bus 115. If the line is in the "Exclusive" status, it is changed to the "Shared" status.

(2-3) When the processor 105a-2 holds the line corresponding to the address "A" in the "Modified" status, the processor 105a-2 returns the cache status "Modified" to the CPU bus 115. Also, it returns the cache line using the WB transaction, and changes the line to be in the "Invalid" status. The processor 105a-1, upon receipt of a notification of the "Modified" status from the CPU bus 115, writes it into the internal cache 110a-1 in response to the WB transaction issued by the processor 105a-2, and changes it to be in the "Exclusive" status (End. However, it performs the WB transaction process).

(3) Hit Check for External Cache:

The CPU bus interface 118 receives the RD transaction in (1) and the cache status response and the WB transaction in (2-1) to (2-3). The CPU bus interface 118 transfers the RD transaction and the cache status response to the cache tag control circuit 120 through a signal line 160-1. The cache tag control circuit 120 receives the RD transaction in (1) and reads an entry (T1a) corresponding to the line address field 210 (for example, A1a) of the address "A" in the cache tag memory 125. Subsequently, it checks two ways associated with the entry T1a to find a way (for example, Way "A") in which the tag 330a or 330b matches 15 the tag field 200 (for example, Ata) of the address "A," and the status bit 310a or 310b is not set at "00b."

(3-1) When Way "A" Does Not Exist:

A way which stores a line for the memory read is determined and designated as Way "A." A determining method is as follows.

When there is a way in which the status bit is set at "00b," this way is used.

When there is no way in which the status bit is set at "00b," a way 1 is used if the LRU bit is "0," and a way 0 is used if the LRU bit is "1."

In this event, the status bit of the way to be used is set to "00b" ("Invalid"), and the LRU bit is inverted.

However, if the status bit is set at "01b" ("Modified" status), it should be used after the most recent line in the cache data memory 145 is written back.

Specifically:

i) The cache tag control circuit 120 sends the address "A" to the cache data control circuit 140 through a signal line 160-11 to instruct to "read the line and transfer it to the network interface 155," and also instructs the network interface 155 through a signal line 160-10 to "send the WB transaction."

ii) The cache data control circuit 140 sends the address shown in FIG. 4 and a read command to the cache data memory 145 through a signal line 160-17 to read a target line from it through a signal line 160-18.

Subsequently, it transfers the read line to the network interface 155 through a signal line 160-19.

iii) The network interface 155 issues the WB request transaction to the network 170. The WB transaction is a transaction which stores in the respective fields shown in FIG. 6, the number of the own processor node in the issuing node number 600, the identifier of the transaction determined by the network interface 155 in the issuing side identifier 610, "0" (access request) in the processing status 630, "2" (WB) in the instruction type 640, the address "A" in the target address 660, and the line for the write back read from the cache data memory 145 in the 0th to 3rd data words 670a to 670d.

iv) The network 170 obtains a target memory node from the three most significant bits of the target address 660 to transfer the WB request transaction to the target memory node. Subsequently, it sets the processing status of the WB transaction to "3" (access response) to transfer only the 0th word to the issuing processor node (WB response transaction).

v) The network interface 155 in the issuing processor node, upon receipt of the WB response transaction, completes the write back processing. Subsequently, the cache tag control circuit 120 forces other possible transactions which want to use this way to wait until the completion of the transaction. After Way "A" is ensured in (3-1), the processing proceeds to (4).

(3-2) When Way "A" Exists:

i) The corresponding line in the cache data memory 145 is read, and is returned as the memory read result. Specifically, the cache tag control circuit 120 sends the address "A" to the cache data control circuit 140 through the signal line 160-11 to instruct it to "read the line and transfer it to the CPU bus interface," and also instructs the CPU bus interface 118 through a signal line 160-2 to "return the memory read result."

ii) The cache data control circuit 140 sends the address shown in FIG. 4 and a read command through the signal line 160-17 to read the target line from the cache data memory 145 through the signal line 160-18. Subsequently, it transfers the read line to the CPU bus interface 118 through a signal line 160-16.

iii) The CPU bus interface 118 sends the target line to the CPU bus 115 to perform a response to the memory read.

iv) The cache tag control circuit 120 sets the CPU bit of Way "A" to "1" to indicate that by the processor in the processor node is caching the line.

v) The processor 105a-1, upon receipt of the memory read response from the CPU bus 115, registers it in the internal cache 110a-1 and uses the accessed data.

vi) With the foregoing processing, the system completes the processing of the RD transaction (End).

(4) Issuance of Memory Read Request Transaction to Network:

The cache tag control circuit 120 sends the address "A" to the network interface 155 through the signal line 160-10 to instruct it to issue the RD request transaction. The network interface 155 issues the RD request transaction to the network 170. The RD request transaction is a transaction which stores in the respective fields shown in FIG. 6, the number of the own processor node in the issuing node number 600, the identifier of the transaction determined by the network interface 155 in the issuing side identifier 610, "0" (access request) in the processing status 630, "0" (RD) in the instruction type 640, and the address "A" in the target address 660.

(5) Transfer of Memory Read Request Transaction through Network:

The network 170 obtains the target memory node from the three most significant bits of the target address 660 to transfer the RD request transaction to the target memory node. It also sets the processing status 630 in the RD request transaction to "1" to change it to the RD cache coherence control request transaction which is transferred to all processor nodes other than the issuing processor node.

(6) Receipt of Cache Coherence Control Request In Other Processor Nodes:

The network interfaces 155 in the other processor nodes 100a to 100b receive the RD cache coherence control request transaction from the network 170. The network interface 155 transfers the address "A" to the cache tag summarized information control circuit 130 through a signal line 160-9 to instruct the RD cache coherence control processing.

(7) Checking of Cache Tag Summarized Information in Other Processor Nodes:

The cache tag summarized information control circuit 130 reads the cache tag summarized information entry corresponding to the line address field 210 in the address "A" from the summarized cache tag memory 135 to examine the bit value corresponding to the two least significant bits of the tag field 200 in the address "A."

(7-1) When Corresponding Bit in Cache Tag Summarized Information Entry is "0:"

The address "A" is not stored in the external cache or internal cache of the processor node. Thus, the cache status "Invalid" is reported to the network interface 155 through a signal line 160-14 (followed by proceeding to (10)).

(7-2) When Corresponding Bit in Cache Tag Summarized Information Entry is "1:"

It is likely that the address "A" has been stored in the external cache or internal cache of the processor node. Thus, the address "A" is transferred to the cache tag control circuit 120 through a signal line 160-6, and the RD cache coherence control processing is instructed.

(8) Checking of Cache Tag in Other Processor Node:

The cache tag control circuit 120, upon receipt of the RD cache coherence control request, reads the cache tag entry corresponding to the line address field 210 of the address "A" from the cache tag memory 125 to perform the hit-check of the external cache in a manner similar to (3).

(8-1) When Address "A" Is Not Stored in External Cache:

The cache status "Invalid" is reported to the network interface 155 through a signal line 160-13 (followed by proceeding to (10)).

(8-2) When address "A" Is Stored in External Cache, and Status Bit 310a or 310b of Associated Way Indicates "Shared:"

The processor node stores the address "A," but does not hold the most recent line. Thus, the cache status "Shared" is reported to the network interface 155 through the signal line 160-13 (followed by proceeding to (10)).

(8-3) When Address "A" is Stored in External Cache, Status Bit 310a or 310b of Associated Way Indicates "Exclusive", and CPU bit 320a or 320b Is Set at "0:"

The processor node stores the address "A", but does not hold the most recent line. Thus, the cache tag control circuit 120 reports the cache status "Shared" to the network interface 155 through the signal line 160-13, and also changes the status bit 310a or 310b of the way to "Shared" to write back it to the cache tag memory 125 (followed by proceeding to (10)).

(8-4) When Address "A" is Stored in External Cache, and Status Bit 310a or 310b of Associated Way Indicates "Modified," and CPU bit 320a or 320b Is Set at "0:"

The processor node stores the most recent line associated with the address "A" in the external cache, and does not hold the address "A" in the internal cache. Thus, the most recent line stored in the cache data memory 145 is sent as the RD cache coherence control result.

Specifically:

i) The cache tag control circuit 120 reports the cache status "Modified" to the network interface 155 through the signal line 160-13, and instructs the cache data control circuit 140 through the signal line 160-11 to "read the line and transfer it to the network interface."

ii) The cache tag control circuit 120 changes the status bit 310*a* or 310*b* of the way to "Invalid" to write back it to the cache tag memory 125.

iii) The cache data control circuit 140 sends the address shown in FIG. 4 and a read command through the signal line 160-17 to read the target line from the cache data memory 145 through the signal line 160-18.

Subsequently, the read line is transferred to the network interface 155 through the signal line 160-19.

iv) The processing proceeds to (10).

(8-5) When Address "A" Is Stored in External Cache, Status Bit 310*a* or 310*b* of Associated Way Indicates "Modified," and CPU bit 320*a* or 320*b* Is Set at "1:"

The processor node stores the most recent line associated with the address "A" in the external cache, and it is likely that any of the processors 105*a*-1 to 105*a*-2 has already modified this. Thus, processing (9) is performed. However, if the result of (9) indicates that no processor holds the most recent line, the same processing as (8-4) is performed.

(8-6) When Address "A" Is Stored in External Cache, Status Bit 310*a* or 310*b* of Associated Way Indicates "Exclusive" and CPU bit 320*a* or 320*b* Is Set at "1:"

It is likely that any of the processors 105*a*-1 to 105*a*-2 in the processor node has modified this. Thus, the processing (9) is performed. However, if the result of (9) indicates that no processor holds the most recent line, the same processing as (8-3) is performed.

(9) Cache Coherence Control by Processor in Another Processor Node:

i) The cache tag control circuit 120 sends the address "A" to the CPU bus interface 118 through the signal line 160-2 to instruct the CPU bus interface 118 to perform the RD cache coherence control.

ii) The CPU bus interface 118 issues the RD transaction to the CPU bus 115.

iii) All the processors 105*a*-1 to 105*a*-2 connected to the CPU bus 115 perform the RD cache coherence control. Specifically, the processor which holds the most recent line associated with the address "A" in the "Modified" status transfers the most recent line to the CPU bus interface 118 through the CPU bus 115 with the WB transaction, and deletes the address "A" from the internal cache 110*a*-1 to 110*a*-2. The processor which holds the address "A" in the "Exclusive" status or in the "Shared" status changes the cache status of the address "A" to "Shared", and returns "Shared" as the cache status. The processor which does not hold the address "A" returns "Invalid" as the cache status.

iv) The CPU bus interface 118 returns the cache status to the cache tag control circuit 120 through the signal line 160-1. The cache status is set to "Modified" when there exists the processor which has returned the "Modified" status, to "Shared" when there exists the processor which has returned the "Shared" status, and otherwise to "Invalid". Also, when the most recent line is received from the CPU bus 115, the most recent line is transferred to the cache data control circuit 140 through a signal line 160-15.

v) The cache tag control circuit 120, upon receipt of "Invalid" as the cache status in iii), sets the CPU bit 320*a* or 320*b* of the associated way to "0." subsequently, the rest of (8-5) or (8-6) is processed.

vi) The cache tag control circuit 120, upon receipt of "Shared" as the cache status in iii), the rest of (8-5) or (8-6) is processed.

vii) The cache tag control circuit 120, upon receipt of "Modified" as the cache status in iii), sets the status bit 310*a* or 310*b* of the associated way to "Invalid." Also, it report the cache status "Modified" to the network interface 155 through the signal line 160-13, and instructs the cache data control circuit 140 to "receive the line from the CPU bus interface and transfer it to the network interface 155," through the signal line 160-11.

viii) The cache data control circuit 140 receives the instruction from the cache tag control circuit 120 to transfer the most recent line to the network interface 155.

(10) Return of Result of Cache Coherence Control by Another Processor Node:

The network interface 155 receives the cache status through the signal line either 160-14 or 160-13 to perform the following processing i) or ii).

i) When Cache Status is "Modified:"

The network interface 155 transfers the most recent line to the network 170 using a RD cache coherence control response transaction. The RD cache coherence control response transaction used herein is a transaction in which the processing status 630 of the RD cache coherence control request transaction is changed to a coherence control response, the cache status 650 is changed to "Modified" and the most recent line is added to the data 670*a* to 670*d*.

ii) When Cache Status is not "Modified:"

The network interface 155 transfers a RD cache coherence control response transaction to the network 170. The RD cache coherence control response transaction used herein is a transaction in which the processing status 630 of the RD cache coherence control request transaction is changed to a coherence control response and the cache status 650 is changed to the cache status received from the signal lines 160-10 and 160-13.

(11) Return of Memory Data by Memory Node:

The target memory node, which has received the RD request transaction from the network 170 in (5), reads a cache line associated with the address "A" to return the RD response transaction to the network 170. The RD response transaction is a transaction in which the processing status 630 of the RD request transaction is changed to an access response and the data 670*a*–670*d* is the read line.

(12) Return of Cache Coherence Control Result and Memory Data through Network:

The network 170 receives the RD response transaction from the target memory node to transfer it to the issuing processor node specified by the issuing node number 600. It also receives the RD cache coherence control response transactions from all the processor nodes to collectively write the cache coherence control results into the cache status 650 and to transfer the RD cache coherence control response transactions to the issuing processor node specified by the issuing node number 600. If the cache status 650 of the cache coherence control response transaction from a processor node is set to "Modified," this transaction is designated as a cache coherence control response transaction. If the cache status 650 of the cache coherence control response transaction from a processor node is set to "Shared," the cache status 650 is set to "Shared." Otherwise, the cache status 650 is set to "Invalid."

(13) Modification of Cache Tag and Cache Tag Summarized Information:

i) The network interface 155 of the issuing processor node receives the RD cache coherence control response transactions and the RD response transaction to report the cache status to the cache tag control circuit 120 through a signal line 160-21 and to transfer them to the cache data control circuit 140 through a signal line 160-20. Here, when the cache status indicates "Modified," the data 670*a* to 670*d* in the RD cache coherence control response transaction are used as the accessed line. When the cache status indicates other than "Modified," the data 670*a* to 670*d* in the RD response transaction are used as the accessed line.

ii) The cache tag control circuit 120 sends the address in the cache data memory 145 for Way "A" through the signal line 160-11 to instruct the cache data control circuit 140 to "accept the line from the network interface, write it into the cache data memory 145, and transfer it to the CPU bus interface 118." The cache data control circuit 140 follows the instructions.

iii) The cache tag control circuit 120 registers the address "A" in Way "A." In this event, the status bit 310*a* and the CPU bit 320*a* or 320*b* are set to "1," and the tag field 200 of the address "A" is set in the tag 330*a* or 330*b*. The status bit 310*a* is set to "Exclusive" when the cache status received from the network interface 155 is "Invalid," to "Shared" when it "Shared," and to "Modified" when it is "Modified."

iv) Simultaneously with iii), the cache tag control circuit 120 transfers the address "A" and the cache tag entry to the cache tag summarized information control circuit 130 through a signal line 160-5. The cache tag summarized information control circuit 130 generates the cache tag summarized information from the cache tag entry to write the generated cache tag summarized information into the cache tag summarized information entry specified by the address "A" on the summarized cache tag memory 135.

v) The cache tag control circuit 120 requests the CPU bus interface 118 to issue the RD response transaction.

(14) Return of Memory Read Result to Issuing Processor:

The CPU bus interface 118 sends the target line to the CPU bus 115 to perform the response to the memory read.

Memory Read and Invalidation of Processor (1) Issuing Memory Read and Invalidate (RI) Transaction by Processor:

The processor (for example, 105*a*-1), upon execution of the memory write instruction to the address "A," checks whether or not a line corresponding to this instruction exists in the internal cache 110*a*-1. When the line corresponding to this instruction exists in the internal cache in the "Exclusive" or "Modified" state, it writes the data in this line. When no corresponding line exists in the internal cache, or when the corresponding line exists in the internal cache but in the "Shared" status, the processor 105*a*-1 issues the RI transaction to the address "A" to the CPU bus 115.

(2) Cache Coherence Control on CPU Bus:

The processor 105*a*-2 connected to the same CPU bus 115 as the processor 105*a*-1 receives the RI transaction to the address "A" to perform the cache coherence control for the internal cache 110*a*-2.

(2-1) When the processor 105*a*-2 does not hold the line corresponding to the address "A," it returns the cache status "Invalid" to the CPU bus 115.

(2-2) When the processor 105*a*-2 holds the line corresponding to the address "A" in the "Shared" status or in the "Exclusive" status, the processor 105*a*-2 returns the cache status "Shared" to the CPU bus 115. Subsequently, the status of the line is changed to the "Invalid" status.

(2-3) When the processor 105*a*-2 holds the line corresponding to the address "A" in the "Modified" status, the processor 105*a*-2 returns the cache status "Modified" to the CPU bus 115. Also, it returns the cache line using the WB transaction to change the line to be in the "Invalid" status. The processor 105*a*-1, upon receipt of a notification of the "Modified" status from the CPU bus 115, takes over the WB transaction issued by the processor 105*a*-2 to write it into the internal cache 110*a*-1. Subsequently, it performs the write associated with the memory write instruction on the internal cache 110*a*-1 to change the cache status to the "Modified" status (End. However, it still performs the WB transaction processing).

(3) Hit Check for External Cache:

The CPU bus interface 118 receives the RD transaction in (1), and the returned cache status and the WB transaction in (2-1) to (2-3). The CPU bus interface 118 transfers the RD transaction and the cache status response to the cache tag control circuit 120 through the signal line 160-1. The cache tag control circuit 120 (the configuration of which will be described later in detail) receives the RD transaction in (1) to read the entry (T1*a*) corresponding to the line address field 210 (for example, A1*a*) of the address "A" in the cache tag memory 125. Subsequently, it checks two ways associated with T1a to find a way (for example, Way "A") in which the tag 330*a* or 330*b* matches with the tag field 200 (for example, A*t*a) of the address "A" and the status bit 310*a* or 310*b* is not set at "00b."

(3-1) When Way "A" Does Not Exist:

A way which stores a line for the memory read is determined and designated as Way "A." The determining method is as follows.

When there is a way in which the status bit is set at "00b," this way is used.

When there is no way in which the status bit is set at "00b, " a way 1 is used if the LRU bit is "0," and a way 0 is used if the LRU bit is "1. " In this event, the status bit of the way to be used is set to "00b" ("Invalid"), and the LRU bit is inverted. However, if the status bit is set at "01b" ("Modified" status), it should be used after the most recent line in the cache data memory 145 is written back.

Specifically:

i) The cache tag control circuit 120 sends the address "A" through the signal line 160-11 to instruct the cache data control circuit 140 to "read the line and transfer it to the network interface 155," and to instruct the network interface 155 through the signal line 160-10 to "send the WB transaction."

ii) The cache data control circuit 140 sends the address shown in FIG. 4 and a read command through the signal line 160-17 to read a target line from the cache data memory 145 through the signal line 160-18. Subsequently, it transfers the read line to the network interface 155 through the signal line 160-19.

iii) The network interface 155 issues the WB request transaction to the network 170. The WB transaction is a transaction which stores in the respective fields shown in FIG. 6, the number of the own processor node in the issuing node number 600, the identifier of the transaction determined by the network interface 155 in the issuing side identifier 610, "0" (access request) in the processing status 630, "2" (WB) in the instruction type 640, the address "A" in the target address 660, and the line for the write back of the cache data control circuit 140 in the 0th to 3rd data words 670*a* to 670*d*.

iv) The network 170 obtains the target memory node from the three most significant bits of the target address 660 to transfer the WB request transaction to the target memory node. Subsequently, it sets the processing status 630 of the WB transaction to "3" (access response), and transfers only the 0th word to the issuing processor node (WB response transaction).

v) The network interface 155 of the issuing processor node, upon receipt of the WB response transaction, completes the write back processing.

Subsequently, the cache tag control circuit 120 forces other transactions using this way to wait until the completion of the transaction.

After Way "A" is ensured in (3-1), the processing proceeds to (4).

(3-2) When Way "A" exists in the "Exclusive" status or in the "Modified" status, the corresponding line in the cache data memory 145 is read and is returned as the memory read and invalidation result.

Specifically:

i) The cache tag control circuit 120 sends the address "A" to the cache data control circuit 140 through the signal line 160-11 to instruct it to "read a line and transfer it to the CPU bus interface," and to instruct the CPU bus interface 118 through the signal line 160-2 to "return the memory read and invalidation result."

ii) The cache data control circuit 140 sends the address shown in FIG. 4 and a read command through the signal line 160-17 to read the target line from the cache data memory 145 through the signal line 160-18. Subsequently, it transfers the read line to the CPU bus interface 118 through the signal line 160-16.

iii) The CPU bus interface 118 sends the target line to the CPU bus 115 to perform the response to the memory read and invalidation.

iv) The cache tag control circuit 120 sets the CPU bit of Way "A" to "1" to indicate that the processor in the processor node is caching the line.

v) The processor 105a-1, upon receipt of the response to the memory read and invalidation from the CPU bus 115, registers it in the internal cache 110a-1, and uses the accessed data.

vi) With the foregoing processing, the system completes the RI transaction processing.

(3-3) When Way "A" exists in the "Shared" status, the caches in the other processor nodes must be invalidated. For this purpose, the processing proceeds to (4).

(4) Issuance of Memory Read and Invalidate Request Transaction to Network:

The cache tag control circuit 120 sends the address "A" to the network interface 155 through the signal line 160-10 to instruct it to issue the RI request transaction. The network interface 155 issues the RI request transaction to the network 170. The RI request transaction is a transaction which stores in the respective fields shown in FIG. 6, the number of the own processor node in the issuing node number 600, the identifier of the transaction determined by the network interface 155 in the issuing side identifier 610, "0" (access request) in the processing status 630, "1" (RI) in the instruction type 640, and the address "A" in the target address 660.

(5) Transfer of Memory Read and Invalidate Request Transaction through Network:

The network 170 obtains the target memory node from the three most significant bits of the target address 660 to transfer the RI request transaction to the target memory node. It also sets the processing status 630 in the RI request transaction to "1" to change it to the RI cache coherence control request transaction which is transferred to the other processor nodes.

(6) Receipt of Cache Coherence Control Request In Other Processor Nodes:

Each of the network interfaces 155 in the other processor nodes 100a to 100b receives the RI cache coherence control request transaction from the network 170. The network interface 155 transfers the address "A" to the cache tag summarized information control circuit 130 through the signal line 160-9 to instruct the RI cache coherence control processing.

(7) Checking of Cache Tag Summarized Information in Other Processor Nodes:

The cache tag summarized information control circuit 130 reads the cache tag summarized information entry corresponding to the line address field 210 in the address "A" from the summarized cache tag memory 135 to examine the bit value corresponding to the two least significant bits of the tag field 200 in the address "A."

(7-1) When the corresponding bit in the cache tag summarized information entry is "0," the address "A" is not stored in the external cache or internal cache of the processor node. Thus, the cache status "Invalid" is reported to the network interface 155 through the signal line 160-14 (followed by proceeding to (10)).

(7-2) When the corresponding bit in the cache tag summarized information entry is "1," it is likely that the address "A" has been stored in the external cache or internal cache of the processor node. Thus, the address "A" is transferred to the cache tag control circuit 120 through the signal line 160-6 to instruct the RI cache coherence control processing.

(8) Checking of Cache Tag in Other Processor Node:

The cache tag control circuit 120, upon receipt of the RI cache coherence control request, reads the cache tag entry corresponding to the line address field 210 in the address "A" from the cache tag memory 125 to perform the hit-check of the external cache in a manner similar to (3).

(8-1) When Address "A" Is Not Stored in External Cache:

The cache status "Invalid" is reported to the network interface 155 through the signal line 160-13 (followed by proceeding to (10)).

(8-2) When address "A" is Stored in External Cache, and Status Bit 310a or 310b of Associated Way Indicates "Shared" or "Exclusive," and CPU bit 320a or 320b Is Set at "0:"

The processor node stores the address "A," but does not hold the most recent line. Thus, the cache tag control circuit 120 reports the cache status "Shared" to the network interface 155 through the signal line 160-13, changes the status bit 310a or 310b of the way to "Invalid," and writes back it into the cache tag memory 125 (followed by proceeding to (10)).

(8-3) When Address "A" is Stored in External Cache, and Status Bit 310a or 310b of Associated Way Has Indicates "Modified," and CPU bit 320a or 320b Is Set at "0"

The processor node stores the most recent line associated with the address "A" in the external cache, and does not hold the address "A" in the internal cache. Thus, the most recent line stored in the cache data memory 145 is sent as the RI cache coherence control result.

Specifically:

i) The cache tag control circuit 120 reports the cache status "Modified" to the network interface 155 through the signal line 160-13 to instruct the cache data control circuit 140 through the signal line 160-11 to "read the line and transfer it to the network interface."

ii) The cache tag control circuit 120 changes the status bit 310a or 310b of the way to "Invalid" to write back it to the cache tag memory 125.

iii) The cache data control circuit 140 sends the address shown in FIG. 4 and a read command through the signal line 160-17 to read the target line from the cache data memory 145 through the signal line 160-18. Subsequently, the read line is transferred to the network interface 155 through the signal line 160-19.

iv) The processing proceeds to (10).

(8-4) When address "A" Is Stored in External Cache, Status Bit 310a or 310b of Associated Way Indicates "Modified," and CPU bit 320a or 320b Is Set at "1:"

The processor node stores the most recent line associated with the address "A" in the external cache, and it is likely that the processors 105a-1 to 105a-2 have already modified this. Thus, the processing (9) is performed. However, if the result of (9) indicates that no processor holds the most recent line, the same processing as (8-4) is performed.

(8-5) When Address "A" Is Stored in External Cache, Status Bit 310a or 310b of Associated Way Indicates "Exclusive" or "Shared," and CPU bit 320a or 320b Is Set at "1:"

It is likely that the processors 105a-1 to 105a-2 in the processor node are caching the line. Thus, the processing (9) is performed. However, if the result of (9) indicates that no processor holds the most recent line, the same processing as (8-2) is performed.

(9) Cache Coherence Control by Processor in Other Processor Nodes:

i) The cache tag control circuit 120 sends the address "A" to the CPU bus interface 118 through the signal line 160-2 to instruct the CPU bus interface 118 to perform the RI cache coherence control.

ii) The CPU bus interface 118 issues the RI transaction to the CPU bus 115.

iii) All the processors 105a-1 to 105a-2 connected to the CPU bus 115 perform the RI cache coherence control. Specifically, the processor which holds the most recent line associated with the address "A" in the "Modified" status transfers the most recent line to the CPU bus interface 118 through the CPU bus 115 to delete the address "A" from the internal cache 110a-1 to 110a-2. The processor which holds the address "A" in the "Exclusive" status or in the "Shared" status changes the cache status of the address "A" to "Invalid" to return "Shared" as the cache status. The processor which does not hold the address "A" returns "Invalid" as the cache status.

iv) The CPU bus interface 118 returns the cache status to the cache tag control circuit 120 through the signal line 160-2. The cache status is set to "Modified" when there exists the processor which has returned the "Modified" status, to "Shared" when there exists the processor which has returned the "Shared" status, and otherwise to "Invalid." Also, if the most recent line is received from the CPU bus 115, the most recent line is transferred to the cache data control circuit 140 through the signal line 160-15.

v) The cache tag control circuit 120, upon receipt of "Invalid" as the cache status in iii), sets the CPU bit 320a or 320b of the associated way to "0." Subsequently, the rest of (8-4) or (8-5) is processed.

vi) The cache tag control circuit 120, upon receipt of "Shared" as the cache status in iii), the rest of (8-4) or (8-5) is processed.

vii) The cache tag control circuit 120, upon receipt of "Modified" as the cache status in iii), sets the status bit 310a or 310b of the associated way to "Invalid." Also, it reports the cache status "Modified" to the network interface 155 through the signal line 160-13, and instructs the cache data control circuit 140 through the signal line 160-11 to "receive the line from the CPU bus interface and transfer it to the network interface 155."

viii) The cache data control circuit 140 receives the instruction from the cache tag control circuit 120 to transfer the most recent line to the network interface 155.

(10) Return of Cache Coherence Control Result by Other Processor Nodes:

The network interface 155 receives the cache status through either of the signal lines 160-14 and 160-13 to perform the following processing i) or ii).

i) When Cache Status is "Modified:"

The network interface 155 transfers the most recent line to the network 170 using the RI cache coherence control response transaction. The RI cache coherence control response transaction is a transaction in which the processing status 630 of the RI cache coherence control request transaction is changed to a coherence control response, the cache status 650 is changed to "Modified" and the most recent line is added to the data 670a to 670d.

ii) When Cache Status is not "Modified:"

The network interface 155 transfers the RI cache coherence control response transaction to the network 170. The RI cache coherence control response transaction is a transaction in which the processing status 630 of the RI cache coherence control request transaction is changed to the coherence control response and the cache status 650 is changed to the cache status received from the signal lines 160-10 and 160-13.

(11) Return of Memory Data by Memory Node:

The target memory node, which has received the RI request transaction from the network 170 in (5), reads the cache line associated with the address "A" to return the RI response transaction to the network 170. The RI response transaction is a transaction in which the processing status 630 of the RI request transaction is changed to an access response and the data 670a to 670d are the read line.

(12) Return of Cache Coherence Control Result and Memory Data through Network:

The network 170 receives the RI response transaction from the target memory node to transfer it to the issuing processor node specified by the issuing node number 600.

It also receives the RI cache coherence control response transactions from all the processor nodes to collectively write the cache coherence control results into the cache status 650 and to transfers the RI cache coherence control response transactions to the issuing processor node specified by the issuing node number 600.

If the cache status 650 of the cache coherence control response transaction from a processor node is set to "Modified," this transaction is designated as the cache coherence control response transaction. If the cache status 650 of the cache coherence control response transaction from a processor node is set to "Shared," the cache status 650 is set to "Shared." Otherwise, the cache status 650 is set to "Invalid."

(13) Modification of Cache Tag and Cache Tag Summarized Information:

i) The network interface 155 of the issuing processor node receives the RI cache coherence control response transactions and the RI response transaction to report the cache status to the cache tag control circuit 120 through the signal line 160-21 and to transfer them to the cache data control circuit 140 through the signal line 160-20. Here, when the cache status is "Modified," the data 670a to 670d in the RI cache coherence control response transaction are used as the accessed line. When the cache status is other than "Modified," the data 670a to 670d in the RI response transaction are used as the accessed line.

ii) The cache tag control circuit 120 sends the address in the cache data memory 145 for Way "A" through the signal line 160-11 to instruct the cache data control circuit 140 to "accept the line from the network interface 155, write it into the cache tag memory 145, and transfer it to the CPU bus interface 118." The cache data control circuit 140 follows the instructions.

iii) The cache tag control circuit 120 registers the address "A" in Way "A." In this event, the status bit 310a and the CPU bit 320a or 320b are set to "1," and the tag 330a or 330b is set to the tag field 200 in the address "A". The status bit 310a is set to "Exclusive" when the cache status received from the network interface 155 is "Invalid" or "Shared," and to "Modified" when the cache status is "Modified."

iv) Simultaneously with iii), the cache tag control circuit 120 transfers the address "A" and the cache tag entry to the cache tag summarized information control circuit 130 through the signal line 160-5. The cache tag summarized information control circuit 130 generates the cache tag summarized information from the cache tag entry to write the generated cache tag summarized information into the cache tag summarized information entry specified by the address "A" on the summarized cache tag memory 135.

v) The cache tag control circuit 120 requests the CPU bus interface 118 to issue the RD response transaction.

(14) Return of Memory Read and Invalidation Result to Issuing Processor:

The CPU bus interface 118 sends the target line to the CPU bus 115 to perform the response to the memory read and invalidation.

Write Back to Memory by Processor (1) Issuance of Memory Write Back (WB) Transaction by Processor:

The processor (for example, 105a-1) issues the WB transaction of a line for the replace to the CPU bus 115 upon replacement of the internal cache 110a-1.

(2) Cache Coherence Control on CPU Bus:

The WB transaction is intended for a line in the "Modified" status stored in the processor 105a-1. Thus, the other processor 105a-2 and so on are not holding this line.

(3) Hit Check for External Line:

The CPU bus interface 118 receives the WB transaction in (1). The CPU bus interface 118 transfers the address "A" of the WB transaction to the cache tag control circuit 120 through the signal line 160-1. The cache tag control circuit 120 (the configuration of which will be described later in detail) receives the WB transaction in (1) to read an entry (T1a) corresponding to the line address field 210 (for example, A1a) of the address "A" in the cache tag memory 125. Subsequently, it checks the ways in the entry T1a to find a way (for example, Way "A") in which the tag 330a or 330b matches with the tag field 200 (for example, Ata) of the address "A" and the status bit 310a or 310b is not set at "00b."

(3-1) When Way "A" does not Exist:

The WB transaction is a transaction for writing back a line registered in the internal cache. Since the line registered in the internal cache has been registered in the external cache without fail, Way "A" exists on the external cache with certainty.

(3-2) When Way "A" Exists In "Exclusive" or "Modified" Status:

A target line for the WB transaction is written back to the cache data memory 145.

Specifically:

i) The cache tag control circuit 120 sends the address "A" to the cache data control circuit 140 through the signal line 160-11 to instruct it to "receive the line from the CPU bus interface and write the line into the cache data memory."

ii) The cache data control circuit 140 sends the address shown in FIG. 4 and a write command to the cache data memory 145 through the signal line 160-17 to write the target line into the cache data memory 145 through the signal line 160-18.

iii) The cache tag control circuit 120 sets the CPU bit 320a or 320b of Way "A" to "0" to indicate that any processor within the processor node is not caching the line. The status bit 310a or 310b of Way "A" is set to "Modified."

iv) With the foregoing processing, the system completes the WB transaction processing (End).

(3-3) When Way "A" Exists in "Shared" Status:

The WB transaction is a transaction for writing back a line in the "Modified" status registered in the internal cache. When the line is in the "Modified" status in the internal cache, it is not in the "Shared" status on the external cache.

The state transitions associated with the external cache in the foregoing processing is outlined in FIG. 5. In FIG. 5, "rmt RD" and "rmt RI" indicate the cache coherence controls from the outside, "RD," "RI," and "WB" indicate the accesses from the inside of the processor node, and "replace" indicates the replacement of the external cache.

Specifically, in FIG. 5:

"Invalid→Invalid" indicates the state transition described in RD (7-1), RD (8-1), RI (7-1), and RI (8-1);

"Invalid→Exclusive" in RD (13) and RI (13);

"Invalid→Shared" in RD (13);

"Invalid→Modified" in RD (13) and RI (13);

"Exclusive→Invalid" in RI (8-2) and RI (8-4);

"Exclusive→Exclusive" in RD (3-2) and RI (3-2);

"Exclusive→Shared" in RD (8-3);

"Exclusive→Modified" in WB;

"Shared→Invalid" in RI (8-2) and RI (8-4);

"Shared→Exclusive" in RI (13);

"Shared→Modified" in RI (13);

"Modified→Invalid" in RD (3-1), RD (8-4), RD (8-5), RI (8-3), and RI (8-4); and

"Modified→Modified" in RD (3-2), RI (3-2), and WB.

Figure 7:
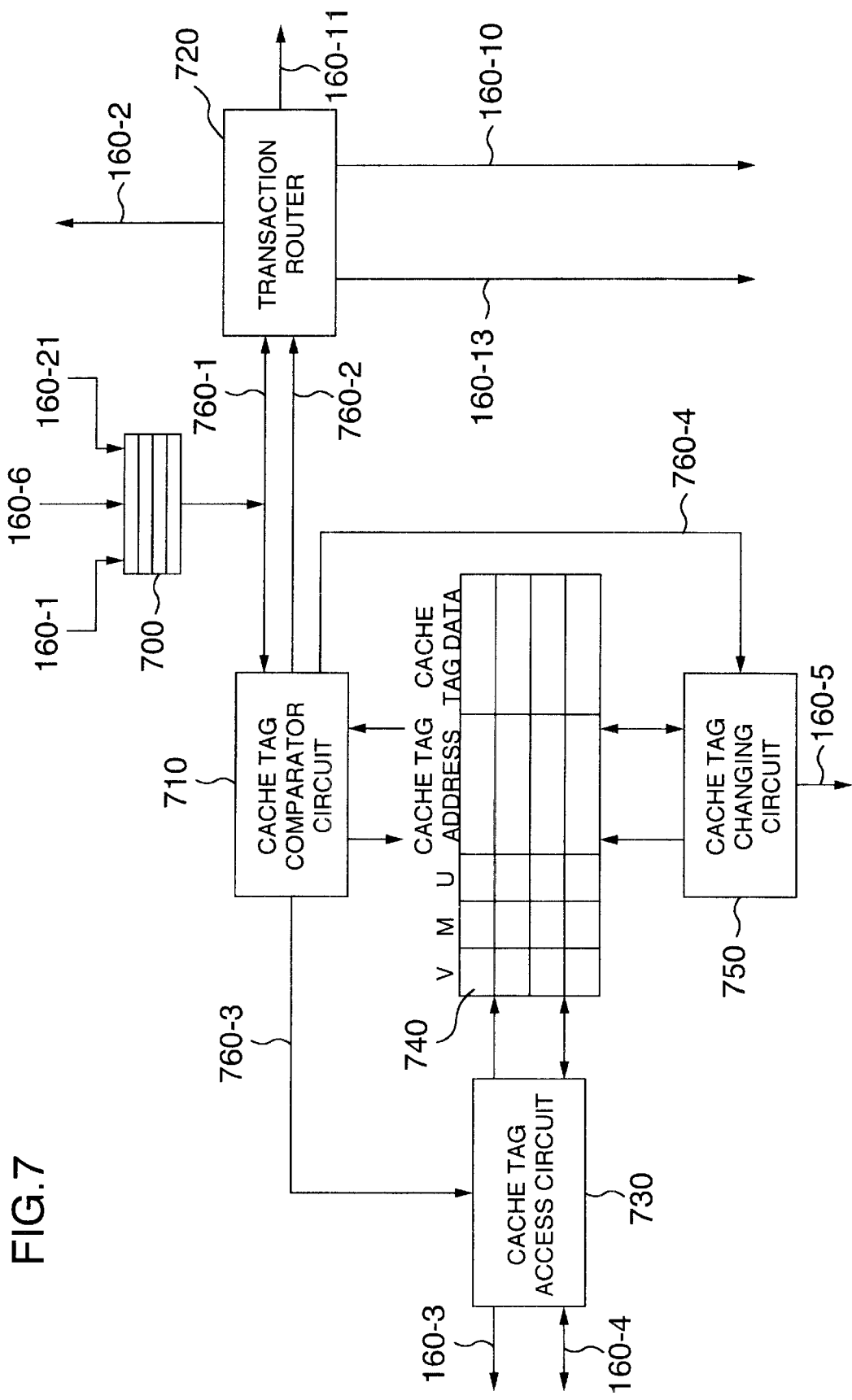
FIG. 7 is a diagram illustrating the configuration of a cache tag control circuit in the parallel computer according to the first embodiment of the present invention.

FIG. 7 illustrates the configuration of the cache tag control circuit 120. The cache tag control circuit 120 comprises a transaction buffer 700 for receiving and temporarily storing a variety of transactions which require a cache tag check; a cache tag buffer 740 for temporarily storing a plurality of cache tag entries; a cache tag comparator circuit 710 for checking a cache tag in accordance with a transaction stored in the transaction buffer 700; a transaction router 720 for instructing a method of processing a particular transaction to the CPU bus interface 118, the cache data control circuit 140, and the network interface 155 in accordance with the type of the transaction and the status of the cache tag; a cache tag access circuit 730 for transferring a cache tag entry between the cache tag memory 125 and the cache tag buffer 740 in accordance with instruction from the cache tag comparator circuit 710; and a cache tag changing circuit 750 for changing the status of the cache tag buffer in accordance with instruction from the cache tag comparator circuit 710.

A request transaction from a processor within the processor node is stored in the transaction buffer 700 from the CPU bus interface 118 through the signal line 160-1. A cache coherence control request transaction from another processor node is stored in the transaction buffer 700 from the network interface 155 and the cache tag summarized information control circuit 120 through the signal line 160-6. A response transaction corresponding to a request transaction issued from a processor within the own processor node is stored in the transaction buffer 700 from the network interface 155 through the signal line 160-21.

The cache tag comparator circuit 710 receives the transaction stored in the transaction buffer 700 to check the cache status of a cache tag entry corresponding to the transaction.

The cache tag buffer 740 (details of which will be described later) is used for checking the cache status. Upon completion of the check on the cache status, the cache status is transferred to the transaction router 720.

The transaction router 720 receives the transaction from the transaction buffer 700 and the cache status corresponding to the transaction from the cache tag comparator circuit 710 to instruct the processing of the transaction to the CPU bus interface 118 through the signal line 160-2, to the cache data control circuit 140 through the signal line 160-11, and to the network interface 155 through the signal line 160-10, as previously shown in the processing of the respective transactions.

The cache tag buffer 740 is a buffer for temporarily storing a plurality of cache tag entries, and comprises fields labeled valid bit (V), modify bit (M), use bit (U), cache tag address and cache tag data.

The valid bit is a bit indicating that the associated entry in the cache tag buffer 740 is valid.

The modify bit is a bit indicating that the associated entry in the cache tag buffer 740 has been modified and it must be written back to the cache tag memory 125. The use bit is a bit indicating that the associated entry in the cache tag buffer 740 is currently in use, i.e., while a transaction using the associated cache tag entry has been issued, this transaction is still uncompleted. The cache tag address indicates the line address of the associated entry in the cache tag buffer 740. The cache tag data stores all bits (all bits in FIG. 3) of the associated entry in the cache tag buffer 740.

For checking the cache status, the cache tag comparator circuit 710 searches the cache tag buffer 740 for the cache tag entries which have the valid bit set at "1" and the cache tag address equal to the line address field 210 of the transaction.

(1) When No Matching Entry Exists in Cache Tag Buffer 740:
  i) The cache tag comparator circuit 710 uses the signal line 760-3 to instruct the cache tag access circuit 730 to read the cache tag memory 125.
  ii) The cache tag access circuit 730 reserves an empty entry in the cache tag buffer 740. Specifically, when an entry having the valid bit set at "0" exists in the cache tag buffer 740, this entry may be used. If no entry having the valid bit set at "0" exists, it selects an entry having the use bit set at "0" and uses this. In this event, if the modify bit is set at "1," the entry is written back to the cache tag memory 125.
  iii) The cache tag access circuit 730 outputs the line address field 210 and the read command to the signal line 160-3 to read the cache tag memory 125, and receives the read entry through the signal line 160-4.
  iv) The cache tag access circuit 730 stores the read entry in a cache tag data portion of the cache tag buffer 740 to set the valid bit to "1," the modify bit to "0," the use bit to "0," and the cache tag address to the line address.
  v) Subsequently, the processing proceeds to (2).

(2) When Matching Entry Exists in Cache Tag Buffer 740:
  i) The use bit is set to "1" when the transaction is the request transaction or the cache coherence control request transaction. The use bit is set to "0" when the transaction is the response transaction.
  ii) When the cache tag data portion is to be changed, the cache tag comparator circuit 710 instructs the cache tag changing circuit 750 through a signal line 760-4 to change the cache tag. The cache tag changing circuit 750, responsive to this, changes the cache tag data portion of the cache tag buffer 740 to set the modify bit to "1."
  iii) When the cache tag data portion has been changed in ii), the cache tag changing circuit 750 instructs the cache tag summarized information control circuit 130 through the signal line 160-5 to change the cache tag summarized information. The cache tag summarized information control circuit 130 modifies the summarized cache tag memory 135 in synchronism with the change in the cache tag data portion in ii).

Figure 9:
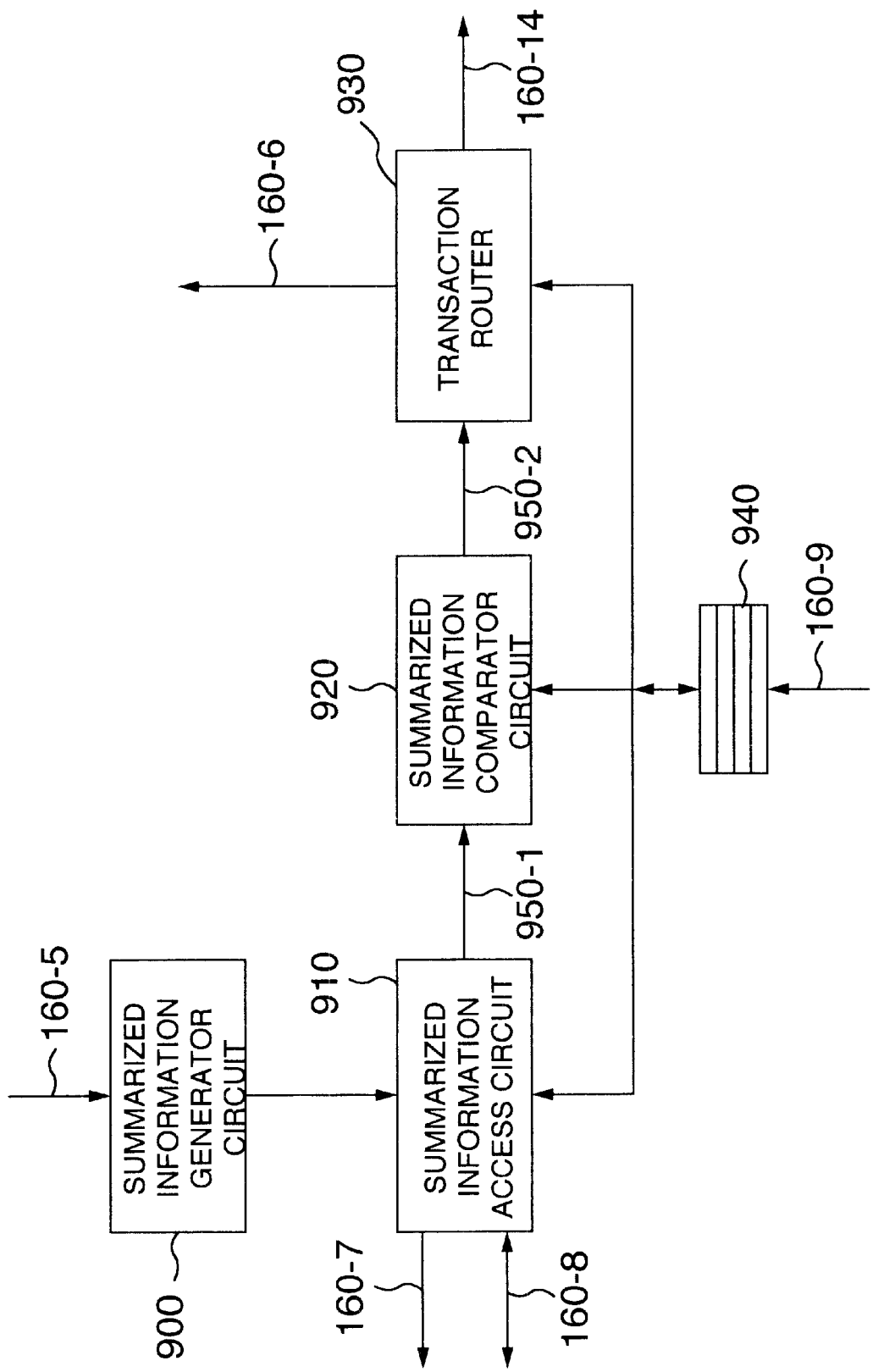
FIG. 9 is a diagram illustrating the configuration of a cache tag summarized information control circuit in the parallel computer according to the first embodiment of the present invention.

FIG. 9 illustrates the configuration of the cache tag summarized information control circuit 130. The cache tag summarized information control circuit 130 comprises a summarized information generator circuit 900, a summarized information access circuit 910, a summarized information comparator circuit 920, a transaction router 930, and a transaction buffer 940. The transaction buffer 940 accepts the cache coherence control request transaction issued by another processor node from the network interface 155 through the signal line 160-9.

The summarized information generator circuit 900 receives a cache tag address and cache tag data from the cache tag changing circuit in the cache tag control circuit 120 through the signal line 160-5 when it changes the cache tag entry, to generate the cache tag summarized information from the cache tag data. Subsequently, it transfers the cache tag address and the cache tag summarized information to the summarized information access circuit 910 to modify the cache tag summarized information in synchronism with the change in the cache tag. the processor in the processor node and the cache coherence control request transaction from another processor node, and the corresponding entry in the summarized cache tag memory 135 can be changed in synchronism with this change. Also, for the cache coherence control request transactions from the other processor nodes, the summarized cache tag memory 135 is first checked so as to partially remove the transactions which do not require the cache coherence control, thereby making it possible to reduce the frequency of accesses to the cache tag memory 125.

In the following, modeling and evaluation will be made for the frequency of the accesses to the cache tag memory 125 in the present embodiment.

In this evaluation, it is assumed that all processor nodes access the memories at the same frequency T MT/s (Mega-Transaction/second), and the cache miss occurs in the external cache memories (125 and 145) in a fraction "Rmiss" of the accesses, thereby causing the RD request transactions to be issued to the network 170. It is also assumed that a fraction "Rsmiss" of the cache coherence control request transactions require the accesses to the cache tag memory 125. With these assumptions, in a system which does not use the cache tag summarized information, the accesses to the cache tag memory 125 would be required for all RD request transactions from the own processor node (T MT/s) . The accesses to the cache tag memory 125 would also be required for the cache coherence control request transactions issued by all processor nodes in the system (T The summarized information access circuit 910 is a circuit for performing a read from the summarized cache tag memory (135) accompanied with the cache coherence control transaction in the transaction buffer 940, and for performing a write into the summarized cache tag memory (135) accompanied with the change in the cache tag summarized information from the summarized information generator circuit 900. The summarized information comparator circuit 920 is a circuit for receiving the cache tag summarized information entry, from the summarized information access circuit 910, corresponding to the cache coherence control transaction in the transaction buffer 940 to check bits in the cache tag summarized information. For each of the cache coherence control transactions in the transaction buffer 940, the transaction router 930 transfers a transaction to the cache tag control circuit 120 through the signal line 160-6 when the result of the comparison in the summarized information comparator circuit 920 indicates that the cache tag memory 125 must be checked, and reports "Invalid" to the network interface 155 through the signal line 160-14 when the result of the comparison in the summarized information comparator circuit 920 indicates that the cache tag memory 125 need not be checked.

By employing the constitution of the cache tag control circuit 120 shown in FIG. 7 and the cache tag summarized information control circuit 130 shown in FIG. 9, the cache tag memory 125 can be changed in accordance with the request transaction and the response transaction from XRmiss MT/s per processor node).

Since the first embodiment has eight processor nodes, the following equation is satisfied.

Cache tag access frequency (without summarized information)=T+7×T×Rmiss

In a system using the cache tag summarized information, within the cache coherence control request transactions issued by all other processor nodes, (1−Rsmiss) transactions will not require the accesses to the cache tag memory 125. Thus, the following equation is satisfied.

Cache tag access frequency (with summarized information)=T+7×T×Rmiss×Rsmiss

Since Rsmiss ≦0.5, the cache tag memory 125 of the present invention can effectively reduce the access frequency to (1+3.5×Rmiss)/(1+7×Rmiss) or less. Thus, when Rmiss=0.5, by way of example, the access frequency is calculated to be 0.61 times.

When the summarized cache tag memory 135 and the cache tag summarized information control circuit 130 are implemented in the processor node control circuit 150 such that the summarized cache tag memory 135 is first checked for the cache coherence control request transaction from another processor node to exclude a portion of transactions which do not require the cache coherence control, the frequency of the accesses to the cache tag memory 125 can be reduced. In this way, when the same cache tag memory 125 is used, the cache coherence control processing can be performed an increased number of times in the processor node as compared with the prior art, thereby improving the memory access throughput of the system.

Second Embodiment

Figure 10:
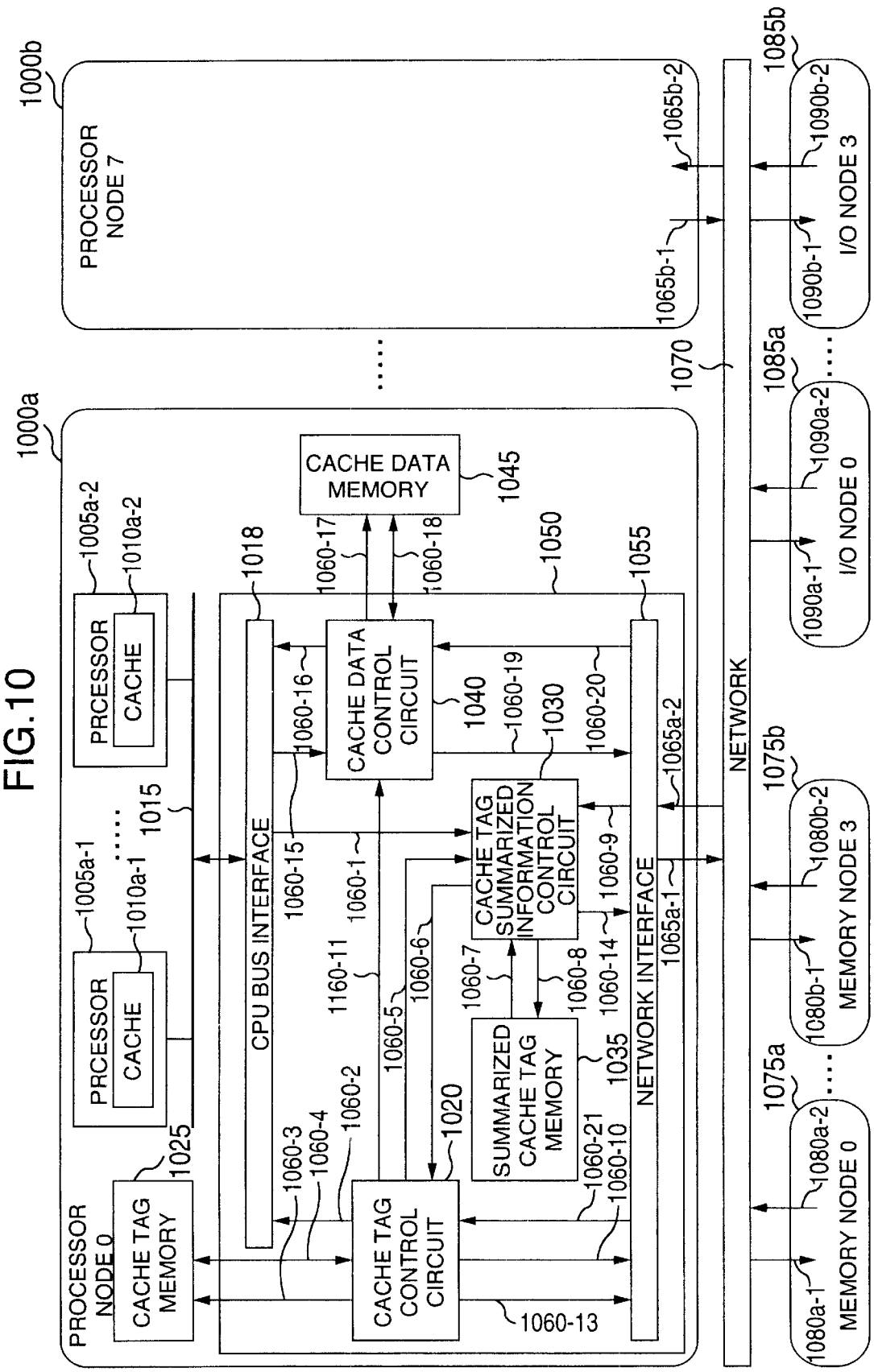
FIG. 10 is a diagram illustrating the configuration of a parallel computer according to a second embodiment of the present invention.

A second embodiment of the present invention will be described with reference to FIG. 10. Since the second embodiment is a variation of the first embodiment, different aspects therebetween will only be discussed below.

The present embodiment differs from the first embodiment in that a request transaction issued by a processor in an own processor node is transferred from a CPU bus interface 1018 to a cache tag summarized information control circuit 1030 through a signal line 1060-1, such that a summarized cache tag memory 1035 is checked before a cache tag memory 1025 is checked.

In the following, details on the memory access operation in a parallel computer according to the present embodiment will be described centered on aspects different from the first embodiment.

In the present embodiment, the summarized cache tag memory 1035 is checked in (3) of the first embodiment. Specifically, the following operations are performed in the memory read by the processor, by way of example.
(3) Hit Check for External Cache:

The CPU bus interface 1018 receives the RD transaction in (1), and the cache status response and the WB transaction in (2-1) to (2-3). The CPU bus interface 1018 transfers the RD transaction and the cache status response to the cache tag summarized information control circuit 1030 through the signal line 1060-1. The cache tag summarized information control circuit 1030 reads the cache tag summarized information entry corresponding to the line address field 210 of the address "A" from the summarized cache tag memory 1035 to check a bit value corresponding to the two least significant bits of the tag field 200 in the address "A."

(3-0a) When Corresponding Bit in Cache Tag Summarized Information Entry is "0:"

The address "A" is not stored in the external cache of the processor node. The cache tag summarized information control circuit 1030 transfers to the cache tag control circuit 1020 through the signal line 1060-6 the RD transaction, the cache status response of the CPU bus 1015, and the fact that the target line is not stored in the external cache.

(3-0b) When Corresponding Bit in Cache Tag Summarized Information Entry is "1:"

It is likely that the address "A" is stored in the external cache of the processor node. Thus, the RD transaction and the cache status response of the CPU bus 1015 are transferred to the cache tag control circuit 1020 through a signal line 1060-6. The cache tag control circuit 1020 receives the RD transaction from the cache tag summarized information control circuit 1030.

In (3-0a), it is known that the line associated with the address "A" is not stored in the external cache, so that the processing in (4) is first performed, and then the following processing is performed. In (3-0b), the processing in (4) is performed after the following processing is performed.

The cache tag control circuit 1020 reads the entry (T1a) corresponding to the line address field 210 (for example, A1a) of the address "A" in the cache tag memory 1025. Subsequently, it finds a way (for example, Way "A") in which the tag 330a or 330b of each ways associated with T1a matches with the tag field 200 (for example, Ata) of the address "A" and the status bit 310a or 310b is not set at "00b."

(3-1) When Way "A" Does Not Exist:

A way which stores the line for the memory read is determined and designated as Way "A." The determining method way is as follows.

When there is a way in which the status bit is set at "00b," this way is used.

When there is no way in which the status bit is set at "00b," a way 1 is used if the LRU bit is "0." A way 0 is used if the LRU bit is "1." In this event, the status bit of the way to be used is set to "00b" ("Invalid"), and the LRU bit is inverted. However, if the status bit is set at "01b" ("Modified" status), it should be used after the most recent line in the cache data memory 1045 is written back.

Specifically:

i) The cache tag control circuit 1020 sends the address "A" through a signal line 1060-11 to instruct the cache data control circuit 1040 to "read the line and transfer it to the network interface 1055," and to instruct the network interface 1055 through a signal line 1060-10 to "send the WB transaction."

ii) The cache data control circuit 1040 sends the address shown in FIG. 4 and the read command through the signal line 1060-17 to read the target line from the cache data memory 1045 through a signal line 1060-18. Subsequently, it transfers the read line to the network interface 1055 through a signal line 1060-19.

iii) The network interface 1055 issues the WB request transaction to the network 1070. The WB transaction is a transaction which stores in the respective fields shown in FIG. 6, the number of the own node in the issuing node number 600, the identifier of the transaction determined by the network interface 1055 in the issuing side identifier 610, "0" (access request) in the processing status 630, "2" (WB) in the instruction type 640, the address "A" in the target address 660, and the line for the write back read from the cache data memory 1045 in the 0th to 3rd data words 670*a* to 670*d*.

iv) The network 1070 obtains the target memory node from the three most significant bits of the target address 660 to transfer the WB request transaction to the target memory node. Subsequently, it sets the processing status of the WB transaction to "3" (access response) to transfer only the 0th word to the issuing processor node (WB response transaction).

v) The network interface 1055 of the issuing processor node, upon receipt of the WB response transaction, completes the write back processing.

Subsequently, the cache tag control circuit 1020 forces the other possible transactions which use this way to wait until the completion of the transaction.

After Way "A" is ensured in (3-1), the processing proceeds to (4).

(3-2) When Way "A" Exists:

The corresponding line in the cache data memory 1045 is read, and is returned as the memory read result.

Specifically:

i) The cache tag control circuit 1020 sends the address "A" to the cache data control circuit 1040 through the signal line 1060-11 to instruct it to "read the line and transfer it to the CPU bus interface," and to instruct the CPU bus interface 1018 through a signal line 1060-2 to "return the memory read result."

ii) The cache data control circuit 1040 sends the address shown in FIG. 4 and the read command through a signal line 1060-17 to read the target line from the cache data memory 1045 through the signal line 1060-18.

Subsequently, it transfers the read line to the CPU bus interface 1018 through a signal line 1060-16.

iii) The CPU bus interface 1018 sends the target line to the CPU bus 1015 to perform the response to the memory read.

iv) The cache tag control circuit 1020 sets the CPU bit of Way "A" to "1" to indicate that the processor in the processor node is caching the line.

v) The processor 1005*a*-1, upon receipt of the response to the memory read from the CPU bus 1015, registers it in the internal cache 1010*a*-1, and uses the accessed data.

vi) With the foregoing processing, the system completes the RD transaction processing (End).

When the processor issues the memory read and invalidate transaction and the memory write back transaction, the similar processing is performed.

In the present embodiment, upon receipt of the transaction issued by the processor in the own processor node, the summarized cache tag memory 1035 can be first checked. In this way, the request transaction can be issued to the network 1055 prior to the reading of the cache tag memory 1025 for the transaction associated with the line which is not cached in the external cache, thereby reducing the processing latency of the transaction issued by the processor.

Third Embodiment

Figure 11:
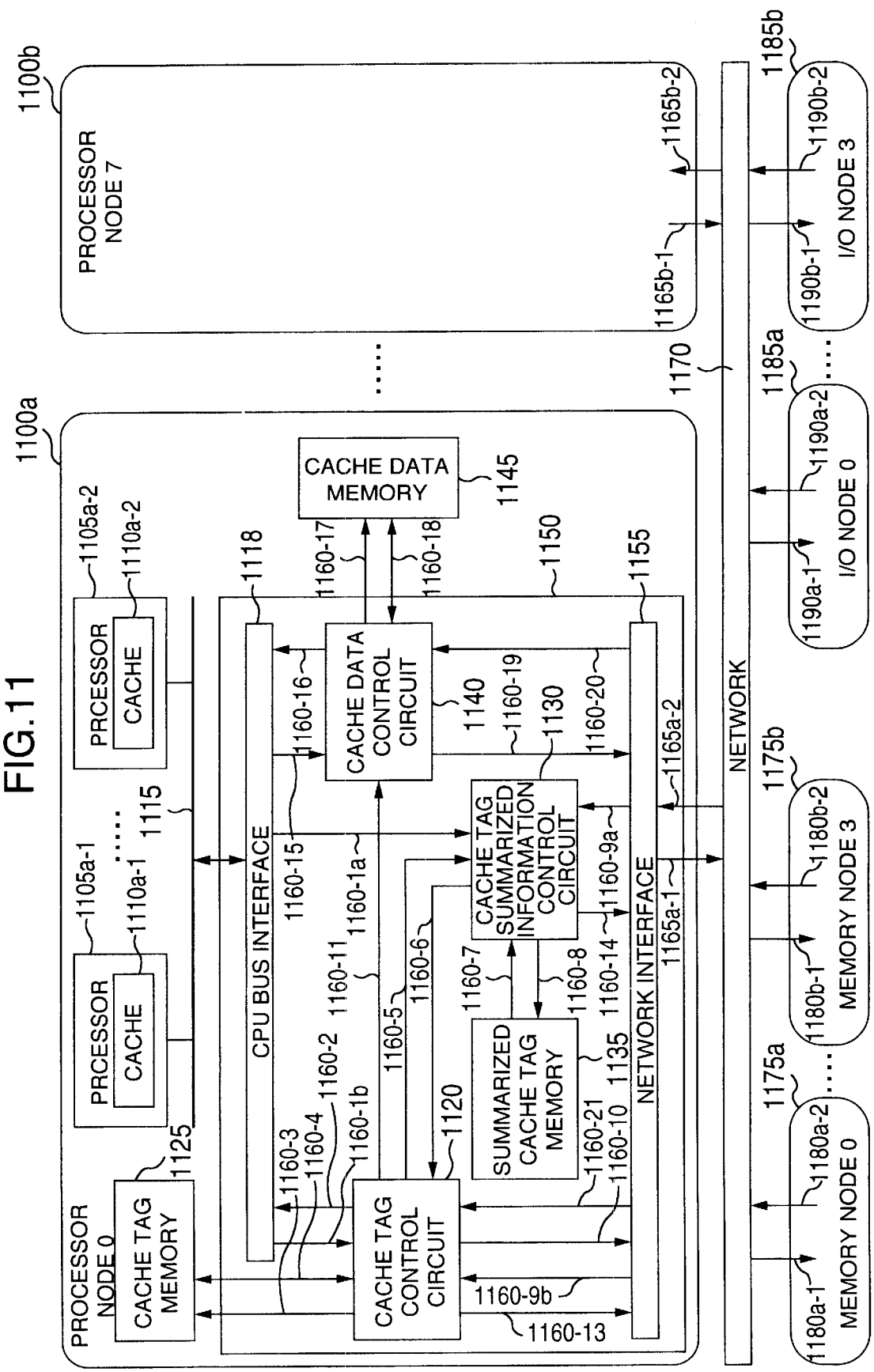
FIG. 11 is a diagram illustrating the configuration of a parallel computer according to a third embodiment of the present invention.

Next, a third embodiment of the present invention will be described with reference to FIGS. 11 to 13. Since the third embodiment is a variation of the second embodiment, different aspects will only be described below.

The present embodiment differs from the second embodiment in that the request transaction issued by the processor in the own processor node is transferred from a CPU bus interface 1118 to a cache tag summarized information control circuit 1130 and a cache tag control circuit 1120 through signal lines 1160-1*a* and 1160-1*b*, and in that the cache coherence control request transaction from another processor node is transferred to the cache tag summarized information control circuit 1130 and the cache tag control circuit 1120 through signal lines 1160-9*a* and 1160-9*b*. With these operations, when the request transaction and the cache coherence control transaction reach at the lower frequency, the cache tag control circuit 1120 and the cache tag summarized information control circuit 1130 can simultaneously start the check of the external cache. Thus, the latency of the transaction processing can be reduced as compared with the sequential operations in the cache tag summarized information control circuit 1130 and the cache tag control circuit 1120. On the other hand, when the request transaction and the cache coherence control transaction reach at the higher frequency, the cache tag control circuit 1120 and the cache tag summarized information control circuit 1130 can simultaneously start the check of the external cache, thereby reducing the frequency of the accesses to the cache tag memory 1125 and improving the throughput of the transaction processing.

In the following, the third embodiment will be described in detail.

Figure 12:
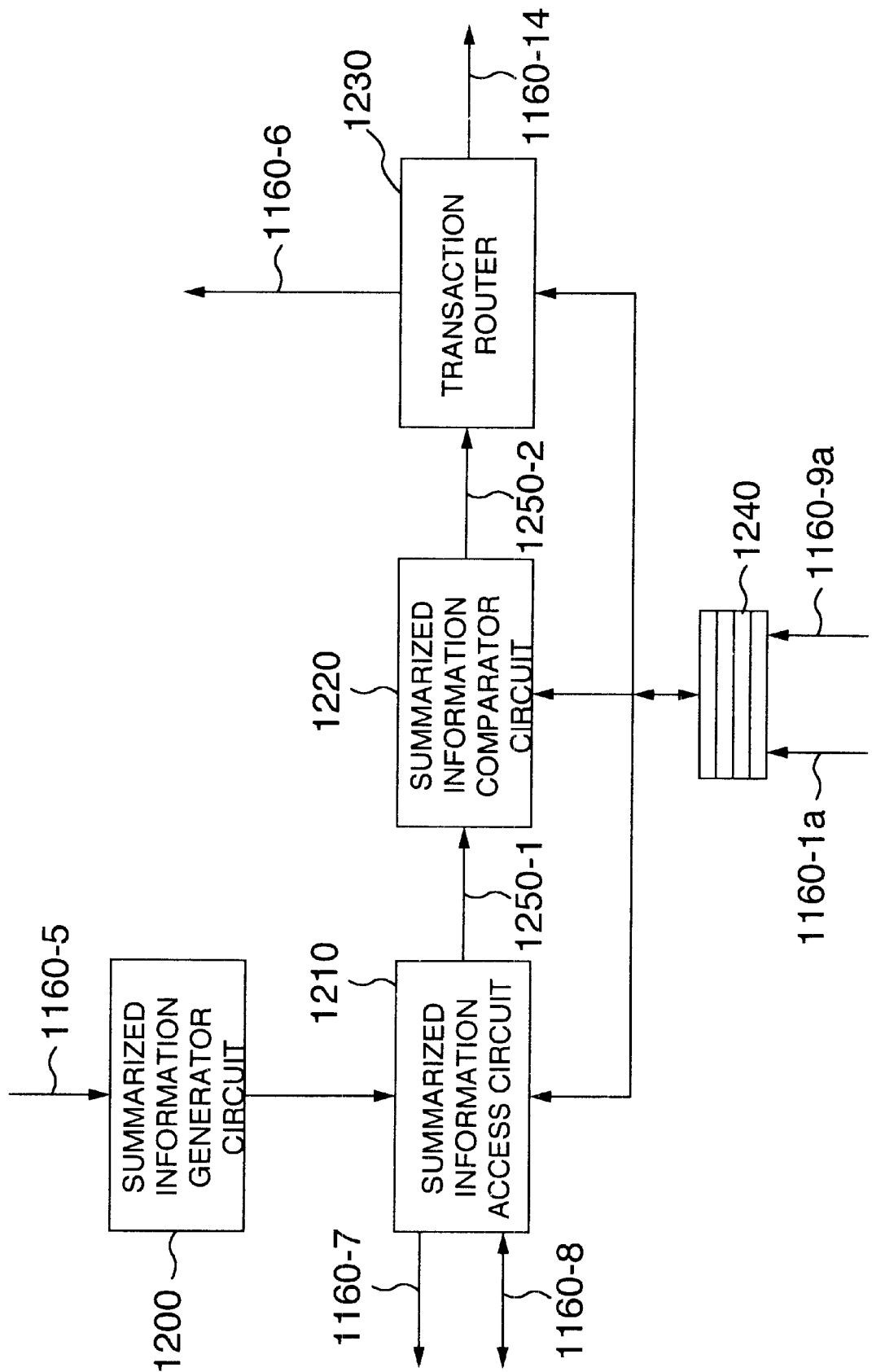
FIG. 12 is a diagram illustrating the configuration of a cache tag summarized information control circuit in the parallel computer according to the third embodiment of the present invention.

FIG. 12 illustrates the configuration of the cache tag summarized information control circuit 1130 in the present embodiment. It is the same as one shown in FIG. 9 except that the signal line 1160-1*a* for transferring the request transaction issued by the processor in the own processor node is added to the transaction buffer 1240.

Figure 13:
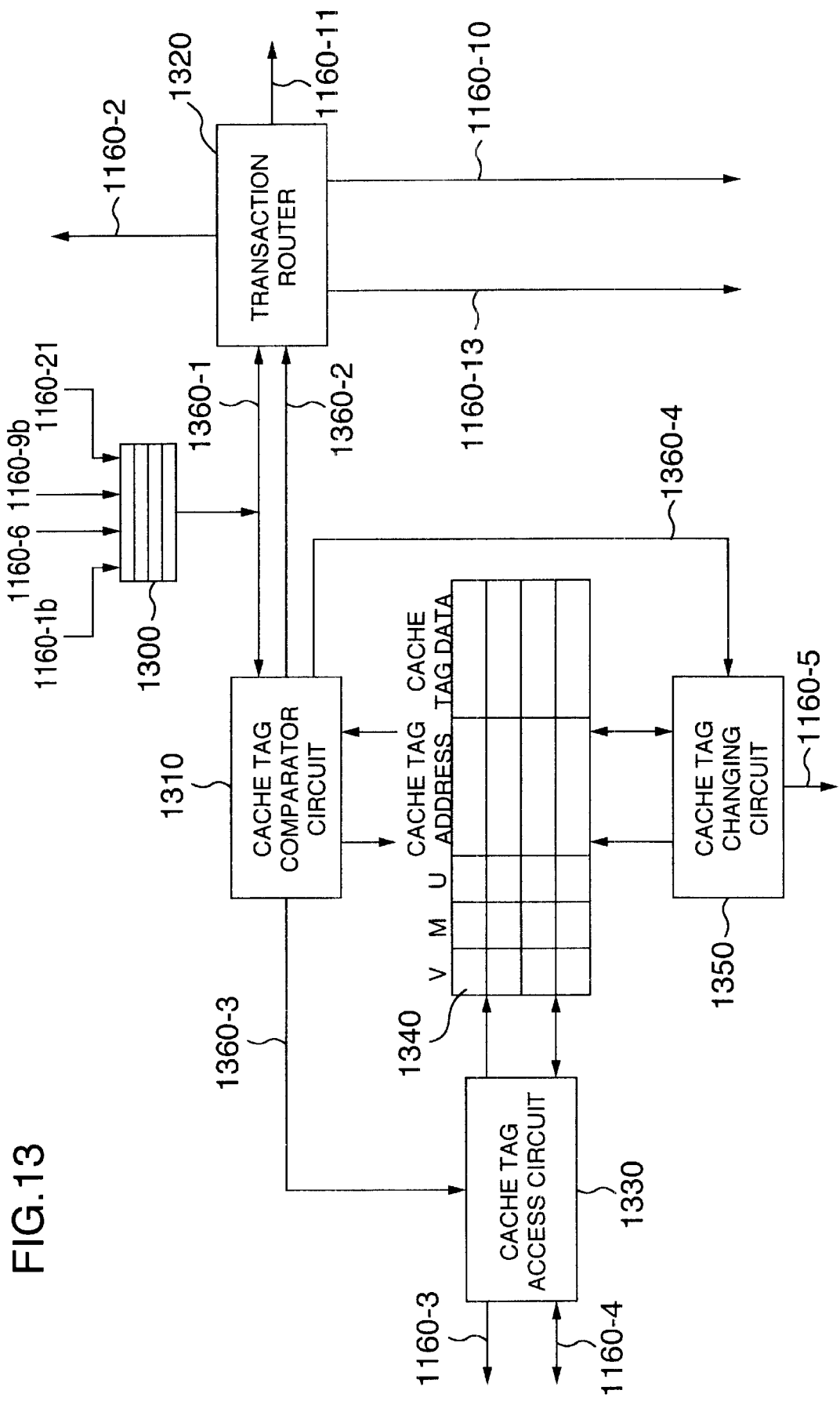
FIG. 13 is a diagram illustrating the configuration of a cache tag control circuit in the parallel computer according to the third embodiment of the present invention.

FIG. 13 illustrates the configuration of the cache tag control circuit 1120 in the present embodiment. It is the same as one shown in FIG. 7 except that the signal line 1190-9*b* for transferring the cache coherence control request transaction from another processor node is added to a transaction buffer 1300.

In the present embodiment, the CPU bus interface 1118 transfers the request transaction issued by the processor in the own processor node to both of the cache tag control circuit 1120 and the cache tag summarized information control circuit 1130 through the signal line 1160-1-*a*and the signal line 1160-1*b*, respectively. Also, a network interface 1155 transfers the cache coherence control request transaction from another processor node to both of the cache tag control circuit 1120 and the cache tag summarized information control circuit 1130 through the signal line 1160-9*a* and the signal line 1160-9*b*, respectively.

The cache tag summarized information control circuit 1130 and the cache tag control circuit 1120 stores each of these transactions in the transaction buffers 1240 and 1300.

The cache tag summarized information control circuit 1130 and the cache tag control circuit 1120 process the transactions stored in the transaction buffer 1240 or 1300 independently of each other. When a certain transaction "A" has been completely processed in the cache tag summarized information control circuit 1130, the result of the check on the cache tag summarized information is transferred to the cache tag control circuit 1120 through a signal line 1160-6.

When the result of the check on the cache tag summarized information reveals that the target line does not exist in the external cache, information indicating that the target line does not exist in the external cache is added to the transaction "A" in the transaction buffer 1300. The cache tag control circuit 1120 can thus progress the processing which should be done when the cache hit does not occur in the external cache for the line, thereby making it possible to reduce the frequency of the accesses to the cache tag memory 1125.

In this event, if the transaction "A" does not exist in the transaction buffer 1300, since the check on the cache tag memory 1125 for the transaction "A" has ended, the result of the check on the cache tag summarized information which is transferred through the signal line 1160-6 is discarded.

When the result of the check on the cache tag summarized information reveals that the target line exists in the external cache, the result of the check on the cache tag summarized information which is transferred through the signal line 1160-6 is discarded. Following this, the cache tag memory 1125 is checked for the transaction "A" in the transaction buffer 1300.

In the present embodiment, when the transaction buffer 1300 in the cache tag control circuit 1120 is empty, the checks on the cache tag summarized information and the cache tag are executed in parallel. On the other hand, when the transaction buffer 1300 in the cache tag control circuit 1120 is not empty, the check on the cache tag summarized information is performed first. In this way, the result of the check on the cache tag summarized information can be added to the transaction in the transaction buffer 1300, thereby reducing the unnecessary accesses to the cache tag memory 1125.

The foregoing is the third embodiment of the present invention.

Fourth Embodiment

Figure 14:
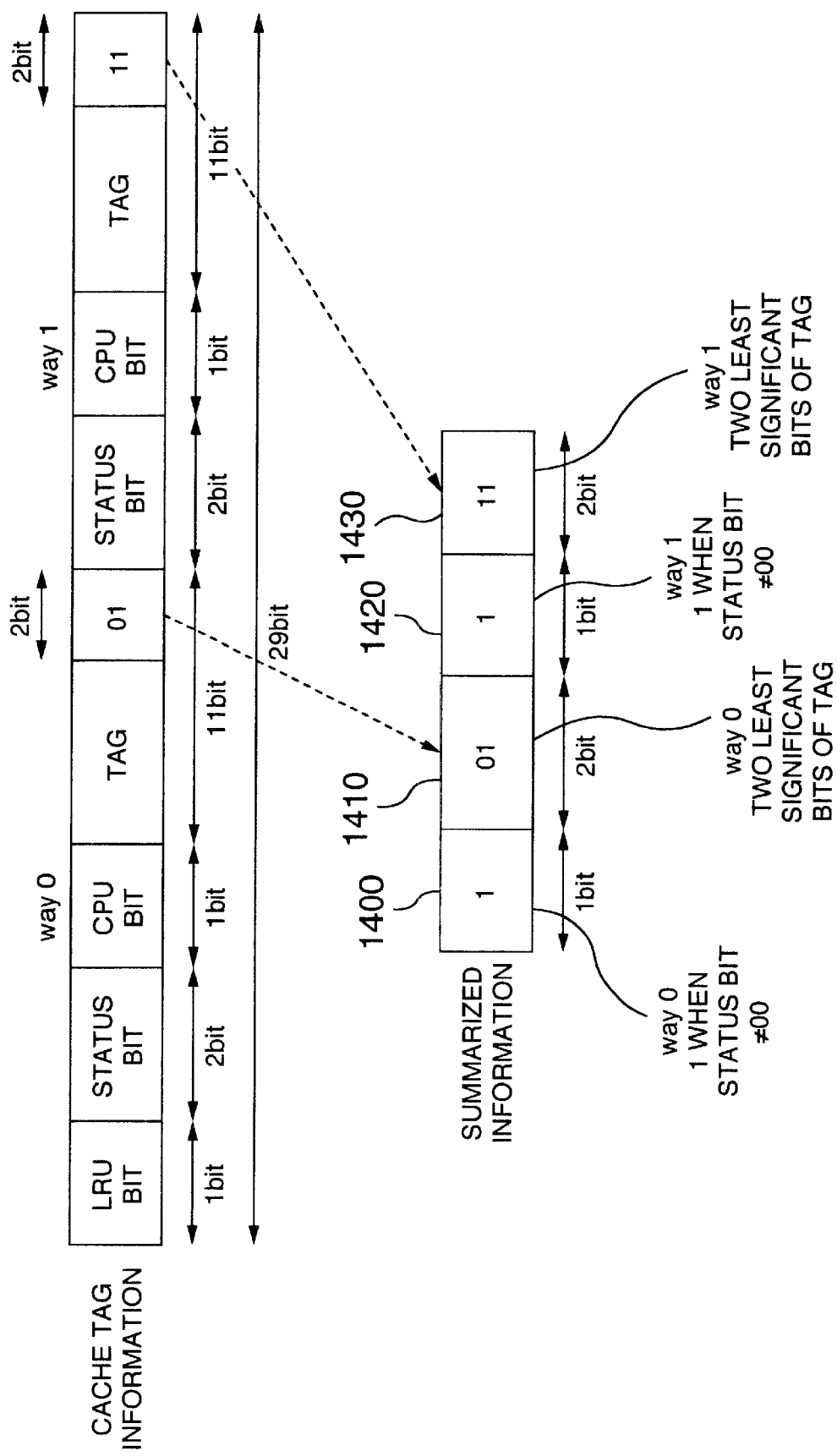
FIG. 14 is a diagram showing the structure of cache tag summarized information stored in a summarized cache tag memory in a parallel computer according to a fourth embodiment of the present invention.

Next, a fourth embodiment of the present invention will be described with reference to FIG. 14. The present embodiment differs from the previous embodiments in that the cache tag summarized information has the structure as shown in FIG. 14.

In the present embodiment, the entry of the cache tag summarized information is 6-bit. Bits 1400 and 1420 are valid bits for way 0 and way 1, respectively, which are set to "1" when the status bits 310a and 310b of the way 0 and way 1 of the cache tag entry are set to any value other than "00b." Bits 1410 and 1430 record the two least significant bits of the tag fields 330a and 330b of the way 0 and way 1, respectively.

Upon the check on the cache tag summarized information for the address "A," the cache tag summarized information entry corresponding to the line address field 210 of the address "A" is read. It can be seen that when the bit 1400 of the cache tag summarized information entry is set at "1" and the bits 1410 is identical to the two least significant bits of the tag field 200 of the address "A," or when the bit 1420 of the cache tag summarized information entry is set at "1" is identical to the bits 1430 and the two least significant bits of the tag field 200 of the address "A," it is likely that the address "A" is stored in the corresponding entry in the cache tag memory 125.

It should be noted that in the cache tag summarized information entry, the bits 1400 and 1420 may be omitted such that the two least significant bits of the tag field 330a of the way 0 are recorded in the bits 1410 only when the way 0 is valid, and the two least significant bits of the tag field 330b of the way 1 are recorded in the bits 1430 only when the way 1 is valid.

The structure of the cache tag summarized information according to the present embodiment can realize the same effects as the bit map configuration in the first to third embodiments.

Fifth Embodiment

Next, a fifth embodiment of the present invention will be described with reference to FIG. 15. The present embodiment applies the scheme shown in the first embodiment to the interior of the processor to reduce the frequency of the accesses to the cache tag by the processor.

Figure 15:
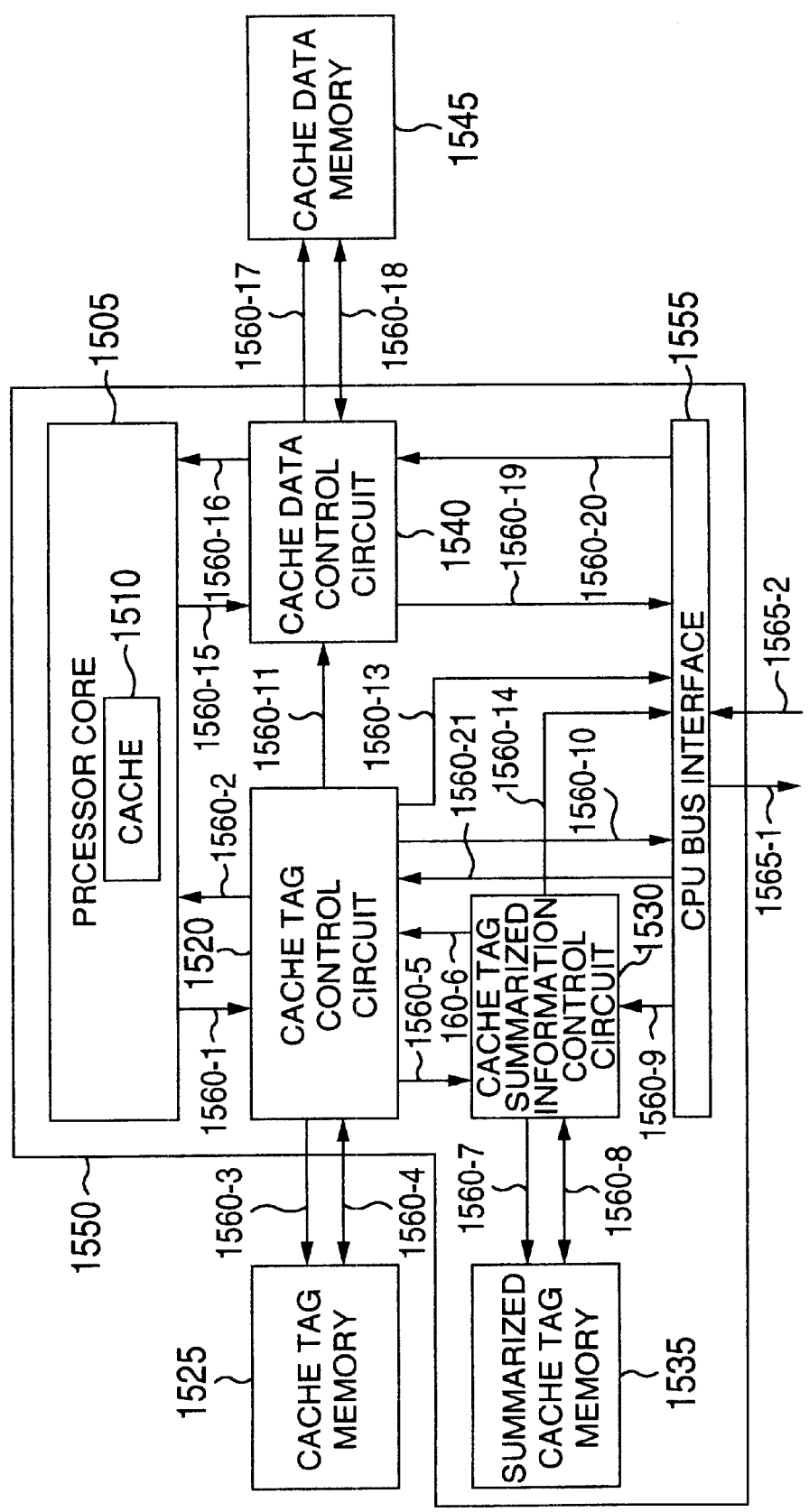
FIG. 15 is a diagram illustrating the configuration of a processor according to a fifth embodiment of the present invention.

FIG. 15 illustrates the configuration of a processor according to the present embodiment. The processor in FIG. 15 comprises a processor circuit 1550, a cache tag memory 1525, a cache data memory 1545, and CPU bus signal lines 1565-1 and 1565-2.

The processor circuit 1550 includes a processor core 1505 for executing a processor instruction, a group of circuits for controlling the cache of the processor (a cache tag control circuit 1520, a cache data control circuit 1540, a cache tag summarized information control circuit 1530, and a summarized cache tag memory 1535), and a CPU bus interface 1555 for sending and receiving signals to and from a CPU bus.

The processor core 1505 may separately have a higher level cache 1510 (a primary cache with respect to a secondary cache, or the like) for the cache (a set of 1525 and 1545). The cache tag control circuit 1520, the cache data control circuit 1540, the summarized cache tag memory 1535, and the cache tag summarized information control circuit 1530 have the same configurations and perform the same operations as their respective corresponding circuits in FIG. 1.

However, the processor transaction sent and received to and from the CPU bus interface 118 in FIG. 1 is replaced by a processor core transaction sent to and received from the processor core 1505. Also, the transaction sent and received to and from the network interface 155 in FIG. 1 is replaced by a transaction sent and received to and from the CPU bus interface 1555.

The CPU bus interface 1555 performs the same operation as the network interface 155 in FIG. 1. A request transaction and a response transaction for a transaction issued by the processor core 1505 perform the same operations as the request transaction and the response transaction for the transaction issued by the processor in the own processor node in FIG. 1. A cache coherence control transaction (snoop transaction) from the outside of the processor performs the same operation as the cache coherence control transaction from another processor node in FIG. 1. The structures of a variety of components and the operations performed thereby during the processing of various transactions are identical to those of the first embodiment.

The summarized cache tag memory 1535 and the cache tag summarized information control circuit 1350 are provided in the processor circuit 1550, so that, for the snoop transactions from the outside of the processor, the summarized cache tag memory 1535 is first checked so as to partially remove the transactions which do not require the cache coherence control, thereby making it possible to reduce the frequency of the accesses to the cache tag memory 1525. In this way, it is possible to realize a system which has a higher memory access frequency using the same cache tag memory 1525.

According to the present invention, the summarized cache tag memory and the cache tag summarized information control circuit are added to the cache memory control circuit, such that the cache memory control circuit accesses the summarized cache tag memory before accessing the cache tag memory. Then, the cache memory control circuit accesses the cache tag memory to determine the cache tag when it is determined as the result of the determination made in the summarized cache tag memory that the target block is likely to be stored in the cache tag portion, and does not access the cache tag memory when it is determined as the result of the determination made in the summarized cache tag memory that the target block is not stored in the cache tag portion.

In this way, as compared with the configuration without applying the present invention, the frequency of the accesses to the cache tag memory can be reduced, so that the cache tag memory can be accessed the increased number of times as compared with the prior art, when using the same cache tag memory, thus improving the throughput of the system.

What is claimed is:

1. A cache memory control circuit for controlling a cache memory provided in a parallel computer system having a shared memory accessible from a plurality of processors, wherein said cache memory having a data portion for selectively storing data blocks of said shared memory and a cache tag portion having a plurality of sets of ways, each of the sets of ways including a plurality of ways each for registering tag information of a data block stored in said data portion, said cache memory controller circuit comprising:

a circuit for controlling said cache memory;

a summarized cache tag memory having a plurality of cache tag summarized information entries corresponding to the plurality of sets of ways of said cache tag portion; and a cache tag summarized information control circuit for controlling said summarized cache tag memory, wherein each of the cache tag summarized information entries possessed by said summarized cache tag memory has a bit length of N bits which is shorter than a total bit length required in each of the plurality of sets of ways of said cache tag portion for registering said tag information, wherein addresses of datablocks likely to be stored in the plurality of sets of ways of said cache tag portion corresponding to said cache tag summarized information entries are classified into N groups, wherein a first bit of each cache tag summarized information entry is registered as true when an effective address of a first group is stored in any way in said cache tag portion, and wherein each of n-th bits of said cache tag summarized information entry is registered as true when an effective address of an n-th group is stored in any way in said cache tag portion, n being an integer from 2 to N.

2. The cache memory control circuit according to claim 1, further comprising:

an interface to one of said processor and an interface to another cache memory controller for controlling another cache memory provided in said parallel processor system, wherein said cache tag summarized information control circuit reads a cache tag summarized information entry in said summarized cache tag memory in response to an access request from said interface to one of said processors or from said interface to another cache memory controller to determine whether or not a target block is likely to be stored in said cache tag portion, wherein said cache tag summarized information control circuit determines that the target block is likely to be stored in said cache tag portion, when a bit corresponding to a group number of an address of the target block directed by said access request is true in said cache tag summarized information entry.

3. The cache memory control circuit according to claim 2, wherein when no access has been issued to said cache tag portion of said cache memory, said cache tag portion is accessed together with an access to said summarized cache tag memory, and wherein when the access has been issued to said cache tag portion of said cache memory, the access to said summarized cache tag memory is only started.

4. The cache memory control circuit according to claim 1, wherein each block stored in said cache memory is managed in one of four statuses including an invalid status ("Invalid"), an exclusive status ("Exclusive"), a shared status ("Shared") and a modified status ("Modified") in said cache tag portion, wherein said invalid status indicates that a target block is not stored in said cache memory, wherein said exclusive status indicates that a target block is stored in said cache memory, the block stored in the cache data portion is identical to corresponding data on a memory, and said block is not stored in any other cache memory connected on the lower hierarchical side, wherein said shared status indicates that a target block is stored in said cache memory, the block stored in the cache data portion is identical to corresponding data on a memory, and said block is likely to be stored in another cache memory connected to the lower hierarchical side, wherein said modified status indicates that a target block is stored in said cache memory, the block stored in the cache data portion stores modified data different from corresponding data on a memory, and said block is not stored in any other cache memory connected on the lower hierarchical side, and wherein contents of an entry are registered in a cache tag summarized information entry in said summarized cache tag memory only when said cache memory holds a block in the modified status or in the shared status.

5. A cache memory control circuit for controlling a cache memory provided in a parallel computer system having a shared memory accessible from a plurality of processors, wherein said cache memory having a data portion for selectively storing data blocks of said shared memory and a cache tag portion having a plurality of sets of ways, each of the sets of ways including a plurality of ways each for registering tag information of a data block stored in said data portion, said cache memory controller circuit comprising:

a circuit for controlling said cache memory;

a summarized cache tag memory having a plurality of cache tag summarized information entries corresponding to the plurality of sets of ways of said cache tag portion; and a cache tag summarized information control circuit for controlling said summarized cache tag memory, wherein each of the plurality of sets of ways in said cache tag portion includes N ways, wherein addresses of blocks likely to be stored in the plurality of sets of ways of said cache tag portions are classified into M groups, wherein each cache tag summarized information entry possessed by said summarized cache tag memory is composed of N fields, wherein each of said fields includes a portion for storing a group number and a bit indicative of validity of said group number, wherein when an address stored in a first way of said cache tag portion is valid, said bit indicative of validity of a first field in said cache tag summarized information entry is set to "1," and a group number of said address is stored in said group number storing portion for registration, wherein when an address stored in the first way of said cache tag portion is not valid, said bit indicative of validity of said first field in said cache tag summarized information entry is set to "0", wherein when an address stored in a second way of said cache tag portion is valid, said bit indicative of validity of a second field in said cache tag summarized information entry is set to "1," and a group number of said address is stored in said group number storing portion for registration, wherein when an address stored in the second way of said cache tag portion is not valid, said bit indicative of validity of said second field in said cache tag summarized information entry is set to "0", wherein when an address stored in an Nth way of said cache tag portion is valid, said bit indicative of validity of an Nth field in said cache tag summarized information entry is set to "1," and a group number of said address is stored in said group number storing portion for registration, and wherein when an address stored in the Nth way of said cache tag portion is not valid, said bit indicative of validity of said Nth field in said cache tag summarized information entry is set to "0."

6. The cache memory control circuit according to claim 5, further comprising:

an interface an interface to one of said processor and an interface to another cache memory controller for controlling another cache memory provided in said parallel processor system, wherein said cache tag summarized information control circuit reads a cache tag summarized information entry in said summarized cache tag memory in response to an access request from said interface to one of said processor or from said interface to another cache memory controller to determine whether or not a target block is likely to be stored in said cache tag portion, and wherein said cache tag summarized information control circuit determines that it is likely that the target block is stored in said cache tag portion, when a group number of the address of the target block directed by said access request is stored in any field of said cache tag summarized information entry and a valid bit in said field is set at "1."

7. A cache memory control circuit for controlling a cache memory provided in a parallel computer system having a shared memory accessible from a plurality of processors, wherein said cache memory having a data portion for selectively storing data blocks of said shared memory and a cache tag portion having a plurality of sets of ways, each of the sets of ways including a plurality of ways each for registering tag information of a data block stored in said data portion, said cache memory controller circuit comprising:

a circuit for controlling said cache memory;

a summarized cache tag memory having a plurality of cache tag summarized information entries corresponding to the plurality of sets of ways of said cache tag portion; and a cache tag summarized information control circuit for controlling said summarized cache tag memory, wherein each of the plurality of sets of ways in said cache tag portion includes N ways, wherein addresses of blocks likely to be stored in the plurality of sets of ways of said cache tag portion are classified into N groups, wherein each cache tag summarized information entry possessed by said summarized cache tag memory is composed of N fields for storing group numbers, wherein when an address stored in a first way of said cache tag portion is valid, a first field of said cache tag summarized information entry stores a group number of said address for registration, wherein when an address stored in a second way of said cache tag portion is valid, a second field of said cache tag summarized information entry stores a group number of said address for registration, and wherein when an address stored in an Nth field of said cache tag portion is valid, an Nth field of said cache tag summarized information entry stores a group number of said address for registration.

8. The cache memory control circuit according to claim 7, further comprising:

an interface to one of said processors and an interface to another cache memory controller for controlling another cache memory provided in said parallel processor system, wherein said cache tag summarized information control circuit reads a cache tag summarized information entry in said summarized cache tag memory in response to an access request from said interface to one of said processors or from said interface to another cache memory controller to determine whether or not a target block is likely to be stored in said cache tag portion, wherein said cache tag summarized information control circuit determines that the target block is likely to be stored in said cache tag portion, when a group number of the address of the target block directed by said access request is stored in any field of said cache tag summarized information entry.

* * * * *